United States Patent
Kawamura et al.

(10) Patent No.: US 8,218,022 B2
(45) Date of Patent: Jul. 10, 2012

(54) IMAGING APPARATUS AND ASSOCIATED METHODOLOGY OF INDEPENDENTLY POWERING COMPONENTS TO LIMIT POWER CONSUMPTION

(75) Inventors: Yuji Kawamura, Chiba (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 12/391,604

(22) Filed: Feb. 24, 2009

(65) Prior Publication Data

US 2009/0237528 A1  Sep. 24, 2009

(30) Foreign Application Priority Data

Mar. 21, 2008 (JP) .............................. 2008-072853

(51) Int. Cl.
*H04N 5/225* (2006.01)
*H04N 5/77* (2006.01)

(52) U.S. Cl. .................................... 348/220.1; 386/225

(58) Field of Classification Search ............... 348/220.1, 348/222.1, 663–665, 667–670, 701; 386/225
See application file for complete search history.

(56) References Cited

U.S. PATENT DOCUMENTS

| 7,242,432 B2 * | 7/2007 | Watanabe | 348/333.11 |
| 2007/0081104 A1 * | 4/2007 | Chen | 348/701 |
| 2007/0115374 A1 * | 5/2007 | Tsujimura et al. | 348/231.99 |

FOREIGN PATENT DOCUMENTS

| JP | 11-341322 | 12/1999 |
| JP | 2000-13721 | 1/2000 |
| JP | 2001-238190 | 8/2001 |
| JP | 2002-51258 | 2/2002 |
| JP | 2002-314866 | 10/2002 |
| JP | 2003-87639 | 3/2003 |

OTHER PUBLICATIONS

Office Action mailed Apr. 24, 2012, in Japanese Patent Application No. 2008-072853.

* cited by examiner

*Primary Examiner* — Kelly L Jerabek
(74) *Attorney, Agent, or Firm* — Oblon, Spivak, McClelland, Maier & Neustadt, L.L.P.

(57) ABSTRACT

An image pickup apparatus includes an image pickup unit configured to photoelectrically convert light into an electrical signal serving as an imaging signal and output the imaging signal at predetermined frame intervals, a memory configured to store the imaging signal output from the image pickup unit, a first signal processing unit configured to generate a Y/C signal from the imaging signal output from the image pickup unit, a second signal processing unit configured to generate a Y/C signal from the imaging signal stored in the memory, and a control unit configured to control power supplied to each of the first and second signal processing units.

14 Claims, 14 Drawing Sheets

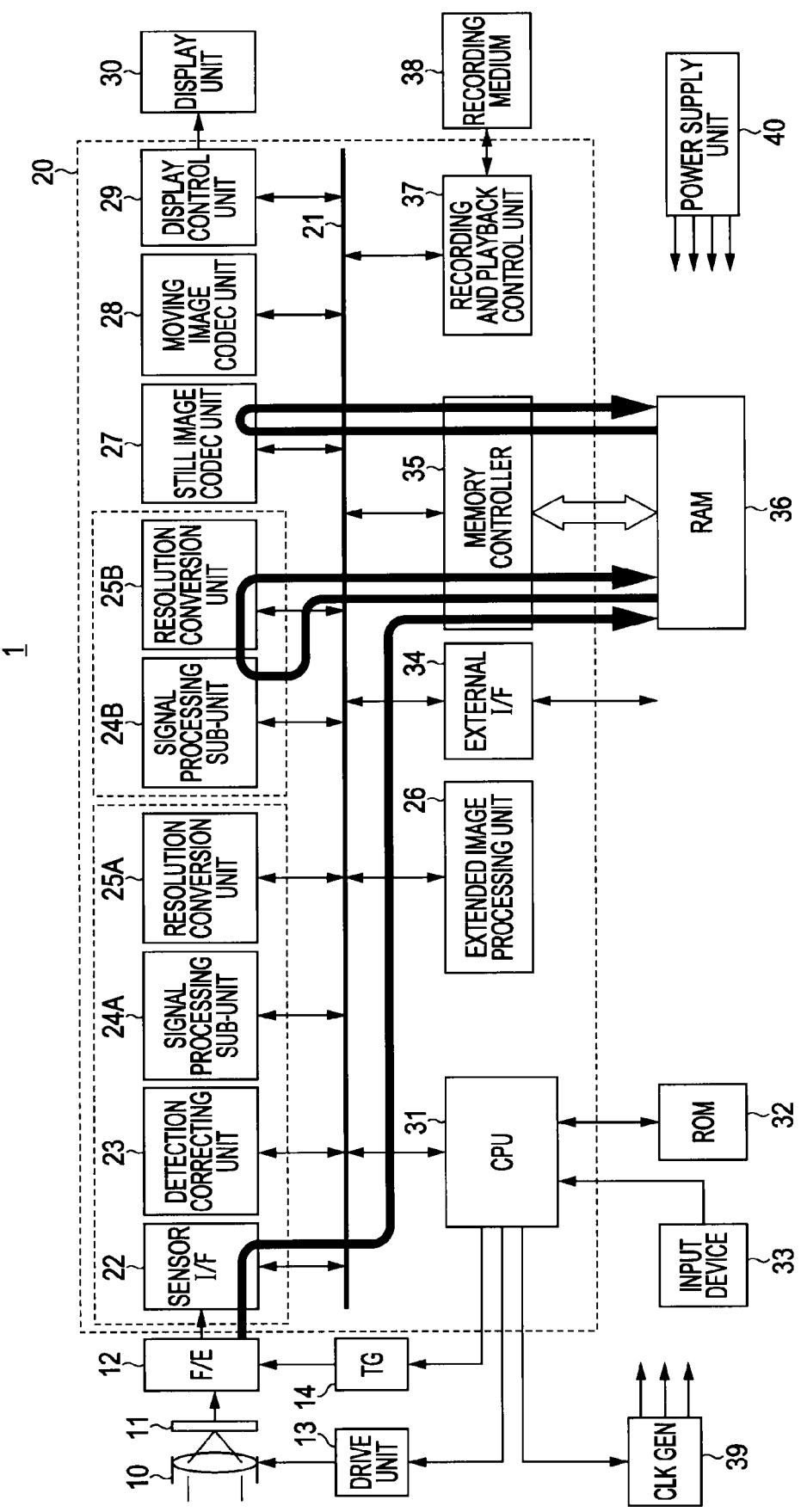

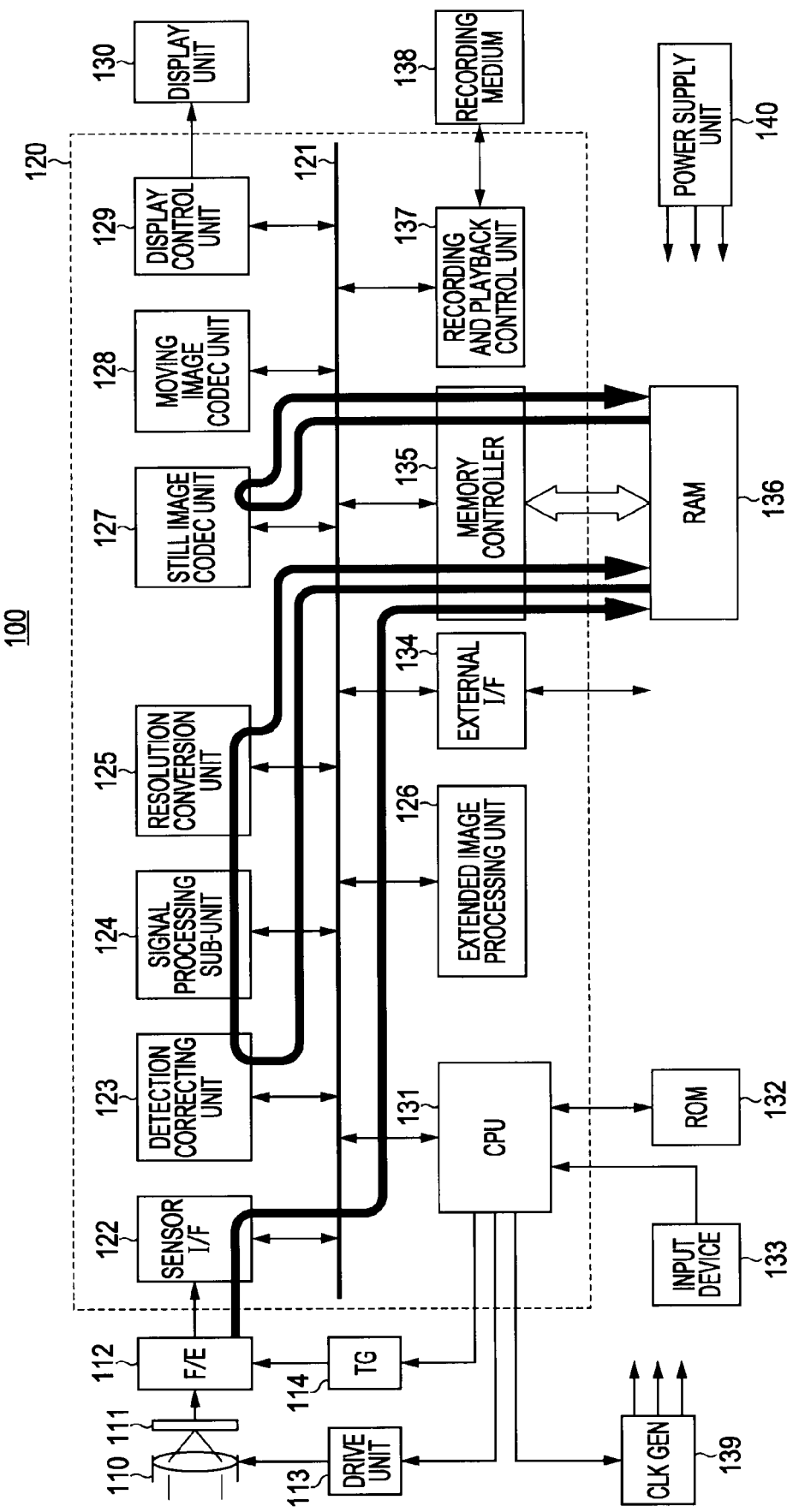

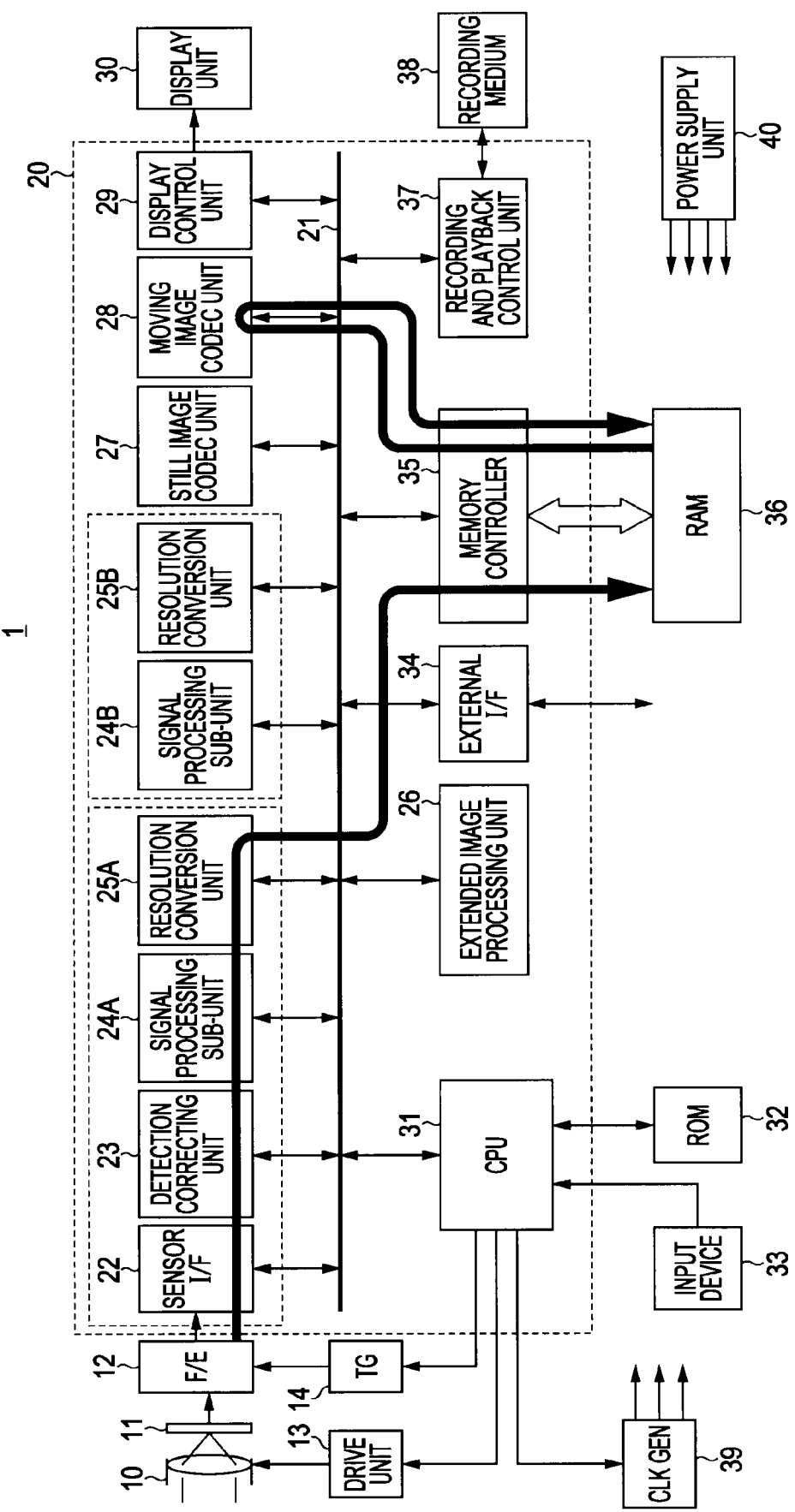

FIG. 12

| | MONITORING | RECORDING OF STILL IMAGE (READOUT) | RECORDING OF STILL IMAGE SIGNAL (PROCESSING) | PLAYBACK OF STILL IMAGE | RECORDING OF MOVING IMAGE | PLAYBACK OF MOVING IMAGE | DRIVING VOLTAGE #1 |
|---|---|---|---|---|---|---|---|
| V1 | ON | ON | ON | OFF | ON | OFF | LOW TO MEDIUM |
| V2 | OFF | OFF | ON | ON | OFF | OFF | HIGH |
| V3 | OFF | OFF | OFF | OFF | ON | ON | MEDIUM |
| V4 | ON | ON | ON | ON | ON | ON | MEDIUM |
| CLOCK FREQUENCY | LOW | MEDIUM | HIGH | HIGH | MEDIUM | MEDIUM | |
| DRIVING VOLTAGE #2 | LOW | MEDIUM | HIGH | HIGH | MEDIUM | MEDIUM | |

FIG. 13

| | MONITORING | RECORDING OF STILL IMAGE (READOUT) | RECORDING OF STILL IMAGE (SIGNAL PROCESSING) | PLAYBACK OF STILL IMAGE | RECORDING OF MOVING IMAGE | PLAYBACK OF MOVING IMAGE | DRIVING VOLTAGE #1 |
|---|---|---|---|---|---|---|---|
| V1 | ON | ON | ON | OFF | ON | OFF | LOW TO MEDIUM |
| V2 | OFF | OFF | ON | ON | OFF | ON CLOCK OFF | HIGH |
| V3 | OFF | OFF | OFF | ON CLOCK OFF | ON | ON | MEDIUM |
| V4 | ON | ON | ON | ON | ON | ON | MEDIUM |
| CLOCK FREQUENCY | LOW | MEDIUM | HIGH | HIGH | MEDIUM | MEDIUM | |
| DRIVING VOLTAGE #2 | LOW | MEDIUM | HIGH | HIGH | MEDIUM | MEDIUM | |

IMAGING APPARATUS AND ASSOCIATED METHODOLOGY OF INDEPENDENTLY POWERING COMPONENTS TO LIMIT POWER CONSUMPTION

BACKGROUND OF THE INVENTION

1. Field of the Invention

The present invention relates to an image pickup apparatus, a method for controlling an image pickup apparatus, a signal processing apparatus, and a method for processing a signal.

2. Description of the Related Art

In recent years, with the advancement of technology, the size of a solid-state image pickup element, such as a charged coupled device (CCD), and power consumption of a solid-state image pickup element have been reduced. In addition, a large scale integration (LSI) has been more highly integrated, an LSI has had a higher performance, and power consumption of an LSI has been reduced. Accordingly, mobile image pickup apparatuses (e.g., digital still cameras) that mainly capture still images and that can be battery operated have been in widespread use.

In such image pickup apparatuses that can be battery operated, in order to increase an operating time and, thus, maximize the number of shots that can be taken, it is desirable that power consumption is reduced.

For image pickup apparatuses, in general, as the frame rate and the resolution of a captured image increases, the amount of data of an image processed per unit time increased. Accordingly, it is necessary to provide a high clock frequency to a circuit that processes such image data.

However, the power consumption of a circuit increases in proportion with the clock frequency used for driving the circuit. Therefore, if the frame rate and the resolution of image data increase, the power consumption increases. Consequently, in order to reduce the power consumption of a circuit, reduction in the frame rate and the resolution is necessary.

However, for image pickup apparatuses (e.g., digital still cameras), the requirement for the frame rate and the resolution of a captured image vary in accordance with an operation mode. For example, in a monitoring mode in which the image of an object is displayed on a display unit (e.g., a monitor) provided on an image pickup apparatus and the angle of view is adjusted before the image is captured, it is desirable that a smoothly moving image is displayed on the display unit. In general, the display unit provided on the image pickup apparatus is small. Accordingly, it is desirable that the frame rate of the moving image is high. However, a high resolution of the image is not necessary.

In contrast, for example, in a shooting mode in which the images of an object are captured, in order to maximize the continuous shooting performance, it is desirable that the processing rate and the resolution of images are maximized. Furthermore, in a playback mode in which a captured still image is played back, an image signal output from an image pickup element is not used, and the resolution of the still image is maximized when the still image is displayed on a display unit.

Such an image pickup apparatus includes a variety of processing blocks, such as an image capturing block, an image processing block, and a display block. The amounts of data processed by these processing blocks per unit time are significantly different in accordance with the operation mode. That is, it is not necessary that these processing blocks operate at their maximum clock frequencies at all times. Therefore, the power consumption of the image pickup apparatus can be reduced by operating the processing blocks at their minimized clock frequencies that allow these processing blocks to normally operate.

Accordingly, existing image pickup apparatuses reduce power consumption by stopping supplying a clock signal to a processing block that is in a completely non-operating state or switching clock frequencies in accordance with a necessary processing rate for the current operation mode.

As shown in FIG. 14, an existing image pickup apparatus 100 receives light made incident on an optical system 110 using an image pickup element 111 and converts the light into an imaging signal. Subsequently, the image pickup apparatus 100 processes the imaging signal using a signal processing unit 120 and a random access memory (RAM) 136, which is an external memory connected to the signal processing unit 120. The imaging signal processed in a predetermined manner is stored in a recording medium 138. The image pickup apparatus 100 stores the imaging signal in the recording medium 138 in the form of moving image data. In addition, the image pickup apparatus 100 can store the imaging signal in the recording medium 138 in the form of still image data captured at an instructed time.

The optical system 110 includes a lens system, an aperture mechanism, a focusing mechanism, and a zooming mechanism. Under the control of a drive unit 113 based on an instruction received from a central processing unit (CPU) 131 (described below) and a manual operation, aperture control, focusing, and zooming are performed. Light output from an object is made incident on the image pickup element 111 via the optical system 110. The image pickup element 111 is formed from, for example, a CCD. The image pickup element 111 converts the incident light into an electrical signal and outputs the electrical signal in a line-sequential manner in the form of an imaging signal. It should be noted that the image pickup element 111 is not limited to a CCD. For example, the image pickup element 111 may be formed from a complementary metal-oxide semiconductor (CMOS) imager.

A front-end (F/E) unit 112 performs correlated double sampling processing on the imaging signal output from the image pickup element 111 in an analog format. In addition, the front-end unit 112 controls the gain of the imaging signal. Thereafter, the Front-end 112 converts the analog imaging signal into a digital imaging signal, which is raw data.

Using a timing signal (a clock pulse) output from a timing generator 114 described below, the image pickup element 111 is controlled so that photoelectric conversion is carried out and an imaging signal is output at predetermined frame intervals. In addition, the Front-end 112 is controlled so as to operate in synchronization with the frame intervals.

The signal processing unit 120 includes the following processing blocks: a sensor interface (I/F) 122, a detection correcting unit 123, a signal processing unit 124, a resolution conversion unit 125, an extended image processing unit 126, a still image codec unit 127, a moving image codec unit 128, a display control unit 129, the CPU 131, an external interface (I/F) 134, a memory controller 135, and a recording and playback control unit 137, which are connected with one another via a bus 121. For example, the signal processing unit 120 is in the form of one LSI.

The raw data output from the front-end unit 112 is input to the sensor I/F 122. The sensor I/F 122 changes the data sequence of the raw data so that the raw data has a data sequence optimal for a correction process and a color conversion process performed as downstream processing. In addition, the sensor I/F 122 switches the use of a sensor driving clock to the use of a system clock. That is, the data supplied to the sensor I/F 122 is the output of the image pickup element

111. The output of the image pickup element 111 is synchronized with a driving clock used for reading out electrical charge from the image pickup element 111. On the other hand, it is necessary that data output from the sensor I/F 122 be synchronized with the internal clock of the signal processing unit 120. Accordingly, the sensor I/F 122 includes a buffer memory. The sensor I/F 122 writes the received data into the buffer memory in synchronization with the sensor driving clock. Subsequently, the sensor I/F 122 reads out the data from the buffer memory in synchronization with the system clock.

The detection correcting unit 123 performs a variety of correction processes (e.g., a defect correction process and a lens correction process) on the supplied raw data. In addition, the detection correcting unit 123 performs a detection process for adjusting a black level, focus, exposure, white balance.

The signal processing unit 124 converts the raw data into an imaging signal having a format suitable for the downstream processing. For example, the signal processing unit 124 performs demosaic processing on the raw data so as to generate a Y/C signal including a luminance signal Y and a color difference signal Cb/Cr. In addition, the signal processing unit 124 performs predetermined processing, such as white balance processing, gamma correction processing, and unsharp mask processing.

In general, the image qualities desired for a still image and a moving image are different. Accordingly, under the control of the CPU 131, the signal processing unit 124 can switch between parameters used when the image correction processing is performed on still image data and when the image correction processing is performed on moving image data.

The resolution conversion unit 125 converts the resolution of baseband moving image data or still image data into a resolution suitable for a display unit 130 described below or a resolution suitable for a recording mode. As used herein, the term "baseband data" refers to data obtained by converting a signal of an analog format to a digital format before being subjected to various processing, such as compression encoding and modulation. In this example, a digital imaging signal obtained by converting an analog signal output from the image pickup element 111 into a digital signal by means of the front-end unit 112 is referred to as "baseband data" when necessary.

The extended image processing unit 126 performs extended image processing, such as an object recognition process or a super high-speed continuous shooting process. In the object recognition process, for example, an image of a human face is extracted from the entire image using a prelearned pattern dictionary. In the super high-speed continuous shooting process, electrical charge in the image pickup element 111 is read out at a significantly high frame rate of, for example, 240 fps (frames per second) for a moving image, as compared with a normal frame rate of 60 fps. A high-speed data transfer capability is necessary for a super high-speed continuous shooting function, as compared with a normal moving image shooting function. Accordingly, in order to provide the super high-speed continuous shooting function, it is desirable that a dedicated processing unit is provided.

The still image codec unit 127 performs a compression encoding process on baseband still image data and a decoding process on compression-encoded still image data. Any type of compression encoding method can be employed. For example, a JPEG (joint photographic expert group) encoding method may be employed. The decoding process of the compressed still image data performed by the still image codec unit 127 is a process that is the reverse of the compression-encoding process.

The moving image codec unit 128 performs a compression-encoding process on baseband moving image data and a decoding process on compression-encoded moving image data. Any type of compression encoding method can be employed. For example, an MPEG 2 (Moving Picture Expert Group 2) encoding method may be employed. The decoding process of the compressed moving image data performed by the moving image codec unit 128 is a process that is the reverse of the compression-encoding process.

The display control unit 129 converts supplied image data into a signal having a format displayable on the display unit 130. For example, the display unit 130 is formed from a liquid crystal display (LCD). The display unit 130 is used for a viewfinder of the image pickup apparatus 100. The display unit 130 further functions as a monitor used for playing back an image stored in the recording medium 138.

A read only memory (ROM) 132 and an input device 133 are connected to the CPU 131. The CPU 131 uses a random access memory (RAM) (not shown) as a work memory so as to perform overall control of the image pickup apparatus 100 in accordance with the instructions of prestored program in the ROM 132.

For example, the CPU 131 communicates a command and data with the blocks of the signal processing unit 120 via the bus 121 so as to control the blocks of the signal processing unit 120. In addition, the CPU 131 generates control signals for controlling focusing, an aperture, and zooming of the optical system 110 on the basis of control signals and an imaging signal in accordance with the operations performed on the input device 133 and supplies the generated control signals to the drive unit 113. The drive unit 113 controls the blocks of the optical system 110 in accordance with the supplied control signals. Furthermore, the CPU 131 submits a command to the timing generator 114 so that the timing generator 114 outputs a predetermined clock pulse.

In response to the commands supplied from the CPU 131, the timing generator 114 generates timing signals necessary for processing the imaging signal output from the image pickup element 111. Examples of the timing signals include a frame synchronization signal, a horizontal synchronization signal, and a vertical synchronization signal.

The input device 133 includes a variety of operating members used for operating the image pickup apparatus 100. The input device 133 outputs a control signal corresponding to an operation performed on one of the operating members. For example, the input device 133 includes a power key used for switching on an off the power supplied from a power supply unit 140, a mode switch key used for switching between the operation modes of the image pickup apparatus 100, such as an image capturing mode and a recording mode, and a key used for moving a cursor. In addition, the input device 133 includes a shutter button used for capturing a still image in the image pickup apparatus 100 and an operating member used for changing focusing, an aperture, and zooming of the optical system 110 when a still image or a moving image is captured.

The external I/F 134 controls exchange of data between the image pickup apparatus 100 and an external apparatus.

The RAM 136 is connected to the memory controller 135. For example, the RAM 136 is formed from a synchronous dynamic random-access memory (SDRAM) operating in synchronization with a memory bus clock. The RAM 136 can perform data input and output with a predetermined data length (a burst length) using burst transfer. The RAM 136 is also used by the units connected to the bus 121. The memory controller 135 performs access control to the RAM 136. When a transfer request of data to the RAM 136 is issued from one of the processing blocks connected to the bus 121, the data transfer request is delivered from the bus 121 to the memory controller 135. The memory controller 135 performs the access control to the RAM 136 in response to the data transfer request.

The recording and playback control unit 137 performs control for recording data into the recording medium 138 and control for playing back data recorded in the recording medium 138. An example of the recording medium 138 is a removable nonvolatile memory.

For example, Japanese Unexamined Patent Application Publication No. 2001-238190 describes a technique for reducing power consumption of such an image pickup apparatus by controlling a clock signal and the voltage of a power supply supplied to circuits corresponding to the above-described function blocks in accordance with an operation mode.

SUMMARY OF THE INVENTION

In recent years, with the improvement in fine processing technology, the threshold voltage of a transistor used in an LSI has been decreased. As the threshold voltage is decreased, a leakage current of the transistor increases, and the ratio of the leakage current to power consumption of the LSI increases. Accordingly, the leakage current is proportion to the scale of the circuit, and it is difficult to ignore the leakage current.

In addition, in the existing image pickup apparatus 100, in order to increase the functionality for each of the operation modes and the processing performance and reduce the scale of the circuit, a plurality of functions are carried out in a single processing block, in general. However, in such a case, while a monitoring operation that consumes most of the power of the image pickup apparatus is being carried out, power is even supplied to processing blocks that do not use power. Therefore, due to the extended functions, power consumption and leakage currents are disadvantageously increased.

Accordingly, the present invention provides an image pickup apparatus, a method for controlling an image pickup apparatus, a signal processing apparatus, and a method for processing a signal capable of reducing the power consumption.

According to an embodiment of the present embodiment, an image pickup apparatus includes an image pickup unit configured to photoelectrically convert light into an electrical signal serving as an imaging signal and output the imaging signal at predetermined frame intervals, a memory configured to store the imaging signal output from the image pickup unit, a first signal processing unit configured to generate a Y/C signal from the imaging signal output from the image pickup unit, a second signal processing unit configured to generate a Y/C signal from the imaging signal stored in the memory, and a control unit configured to control power supplied to the first and second signal processing units.

According to another embodiment of the present embodiment, a method for controlling an image pickup apparatus includes the steps of (a) photoelectrically converting light into an electrical signal serving as an imaging signal and outputting the imaging signal at predetermined frame intervals, (b) writing the imaging signal output from step (a) into a memory, (c) generating, using a first signal processing unit, a Y/C signal from the imaging signal output in step (a), (d) generating, using a second signal processing unit, a Y/C signal from the imaging signal stored in the memory, and (e) controlling power supplied to each of the first and second signal processing units.

According to still another embodiment of the present embodiment, a signal processing apparatus includes a memory control unit configured to perform control so that a signal input thereto at predetermined frame intervals is written to an external memory, a first signal processing unit configured to generate a Y/C signal from the input signal, a second signal processing unit configured to generate a Y/C signal from the signal stored in the external memory, and a control unit configured to control power supplied to each of the first and second signal processing units.

According to yet still another embodiment of the present embodiment, a method for processing a signal includes the steps of performing control so that a signal input at predetermined frame intervals is written to an external memory, generating, using a first signal processing unit, a Y/C signal from the input signal, generating, using a second signal processing unit, a Y/C signal from the signal written to the external memory, and controlling power supplied to each of the first and second signal processing units.

As described above, according to the embodiments of the present embodiment, light is photoelectrically converted into an electrical signal serving as an imaging signal. The imaging signal is output at predetermined frame intervals. The output imaging signal is stored in a memory. In addition, the first signal processing unit generates a Y/C signal from the output imaging signal. The second signal processing unit generates a Y/C signal from the imaging signal stored in the memory. Thus, the power supplied to the first signal processing unit and the power supplied to second signal processing units are controlled. Accordingly, the power supplied to the first signal processing unit can be separated from the power supplied to the second signal processing unit. In this way, the power supplied to blocks that do not use the power can be reduced.

In addition, according to the embodiments of the present embodiment, a signal input at predetermined intervals is written to an external memory. The first signal processing unit generates a Y/C signal from the input signal, and the second signal processing unit generates a Y/C signal from the signal stored in the external memory. Accordingly, the power supplied to the first signal processing unit can be separated from the power supplied to the second signal processing unit. In this way, the power supplied to processing blocks that do not use the power can be reduced.

According to the above-described embodiments, light is photoelectrically converted into an electrical signal serving as an imaging signal. The imaging signal is output at predetermined frame intervals. The output imaging signal is stored in a memory. In addition, the first signal processing unit generates a Y/C signal from the output imaging signal. By separating the power supplied to the first signal processing unit from the power supplied to the second signal processing unit, the power supplied to processing blocks that do not use the power can be blocked, and therefore, the power consumption can be advantageously reduced.

In addition, according to the above-described embodiments, by stopping supplying the power to the processing blocks that do not use the power in each of the operation modes, a leakage current can be advantageously reduced.

BRIEF DESCRIPTION OF THE DRAWINGS

FIG. 5 is a block diagram schematically illustrating an exemplary operation performed by the image pickup apparatus in a still image recording mode, according to the first embodiment of the present invention;

FIG. 6 is a block diagram schematically illustrating an operation performed by an existing image pickup apparatus in a still image recording mode;

FIG. 8 is a block diagram schematically illustrating an exemplary operation performed by the image pickup apparatus in a moving image recording mode, according to the first embodiment of the present invention;

FIG. 12 illustrates a relationship among the settings of the power supply voltages in each operation mode and the clock frequency;

FIG. 13 illustrates a relationship among the settings of the power supply voltages in each operation mode and the clock frequency.

DESCRIPTION OF THE PREFERRED EMBODIMENTS

Figure 1:
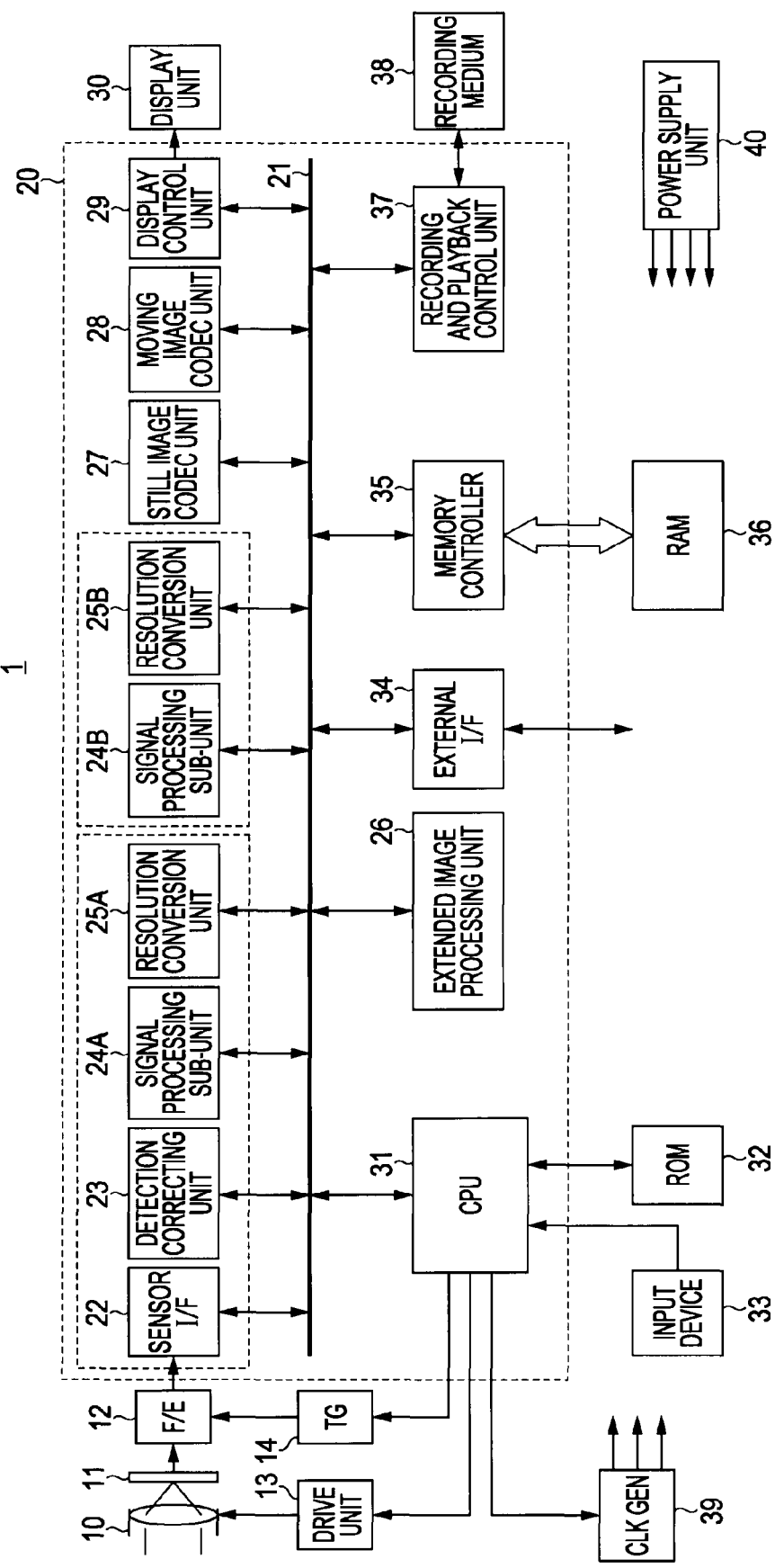
FIG. 1 is a block diagram illustrating an exemplary configuration of an image pickup apparatus according to a first embodiment of the present invention.

Before describing an exemplary embodiment of the present invention, the correspondence between the features of the claims and the specific elements disclosed in the exemplary embodiment of the present invention is discussed below.

An image pickup apparatus according to an embodiment of the present invention includes an image pickup unit (e.g., an image pickup element 11 shown in FIG. 1) configured to photoelectrically convert light into an electrical signal serving as an imaging signal and output the imaging signal at predetermined frame intervals, a memory (e.g., a RAM 36 shown in FIG. 1) configured to store the imaging signal output from the image pickup unit, a first signal processing unit (e.g., a signal processing sub-unit 24A shown in FIG. 1) configured to generate a Y/C signal from the imaging signal output from the image pickup unit, a second signal processing unit (e.g., a signal processing sub-unit 24B shown in FIG. 1) configured to generate a Y/C signal from the imaging signal stored in the memory, and a control unit (e.g., a CPU 31 shown in FIG. 1) configured to control power supplied to each of the first and second signal processing units.

According to an embodiment of the present invention, a method for controlling an image pickup apparatus includes the steps of (a) photoelectrically converting light into an electrical signal serving as an imaging signal and outputting the imaging signal at predetermined frame intervals, (b) writing the imaging signal output in step (a) into a memory, (c) generating, using a first signal processing unit, a Y/C signal from the imaging signal output from step (a), (d) generating, using a second signal processing unit, a Y/C signal from the imaging signal stored in the memory, and (e) controlling power supplied to each of the first and second signal processing units.

A signal processing apparatus according to an embodiment of the present invention includes a memory control unit (e.g., a memory controller 35 shown in FIG. 1) configured to perform control so that a signal input thereto at predetermined frame intervals is written to an external memory, a first signal processing unit (e.g., the signal processing sub-unit 24A shown in FIG. 1) configured to generate a Y/C signal from the input signal, a second signal processing unit (e.g., the signal processing sub-unit 24B shown in FIG. 1) configured to generate a Y/C signal from the signal stored in the external memory, and a control unit (e.g., the CPU 31 shown in FIG. 1) configured to control power supplied to each of the first and second signal processing units.

According to an embodiment of the present invention, a method for processing a signal includes the steps of performing control so that a signal input at predetermined frame intervals is written to an external memory, generating, using a first signal processing unit, a Y/C signal from the input signal, generating, using a second signal processing unit, a Y/C signal from the signal written to the external memory, and controlling power supplied to each of the first and second signal processing units.

A first embodiment of the present invention is described below with reference to the accompanying drawings. FIG. 1 illustrates an exemplary image pickup apparatus 1 according to the first embodiment of the present invention. The image pickup apparatus 1 receives light input through an optical system 10 using an image pickup element 11 and converts the light into an electrical signal serving as an imaging signal. Thereafter, the image pickup apparatus 1 performs predetermined processing on the imaging signal using a signal processing unit 20 and a RAM 36, which is an external memory connected to the signal processing unit 20. The image pickup apparatus 1 then stores the imaging signal in a recording medium 38. In addition, the image pickup apparatus 1 includes processing blocks that carry out a monitoring operation used for adjusting the angle of view before an image is actually captured, moving image processing, and still image processing in a hierarchical fashion. Thus, power can be independently supplied to the individual processing blocks.

The optical system 10 includes a lens system, an aperture mechanism, a focusing mechanism, and a zooming mechanism. Under the control of a drive unit 13 based on an instruction received from a central processing unit (CPU) 31 (described below) and a manual operation, aperture control, focusing, and zooming are performed. Light output from an object is made incident on the image pickup element 11 via the optical system 10. The image pickup element 11 is formed from, for example, a CCD. The image pickup element 11 converts the incident light into an electrical signal and outputs the electrical signal in a line-sequential manner in the form of an imaging signal. It should be noted that the image pickup element 11 is not limited to a CCD. For example, the image pickup element 11 may be formed from a complementary metal-oxide semiconductor (CMOS) imager.

A front-end (F/E) unit 12 includes, for example, a noise reduction sub-unit, an automatic gain control sub-unit, and an analog to digital (A/D) converter. The noise reduction sub-unit reduces noise by performing a correlated double sampling process on the imaging signal output from the image pickup element 11 in an analog format, and the automatic gain control sub-unit controls the gain of the imaging signal. Thereafter, the A/D converter converts the analog imaging signal into a digital imaging signal and outputs the digital imaging signal. The digital imaging signal serves as raw data including data directly corresponding to individual pixels of the image pickup element 11.

Using a timing signal (a clock pulse) output from a timing generator 14 described below, the image pickup element 11 is controlled so that photoelectric conversion is carried out and an imaging signal is output at a predetermined frame interval. In addition, the front-end unit 12 is controlled so as to operate in synchronization with the frame interval.

The signal processing unit 20 includes the following processing blocks: a sensor interface (I/F) 22, a detection correcting unit 23, signal processing sub-units 24A and 24B, resolution conversion units 25A and 25B, an extended image processing unit 26, a still image codec unit 27, a moving image codec unit 28, a display control unit 29, the CPU 31, an external interface (I/F) 34, a memory controller 35, and a recording and playback control unit 37, which are connected with one another via a bus 21. For example, the signal processing unit 20 may be in the form of one LSI. The sensor I/F 22, the detection correcting unit 23, the signal processing sub-unit 24A, and the resolution conversion unit 25A are separate from one another in, for example, a hierarchical fashion.

The raw data output from the front-end unit 12 is input to the sensor I/F 22. The sensor I/F 22 changes the data sequence of the raw data so that the raw data has a data sequence optimal for a correction process and a color conversion process performed as downstream processing. The sensor I/F 22 further changes the use of a sensor driving clock to the use of a system clock. That is, the data supplied to the sensor I/F 22 is the output of the image pickup element 11. The output of the image pickup element 11 is synchronized with a driving clock used for reading out electrical charge from the image pickup element 11. On the other hand, it is necessary that data output from the sensor I/F 22 is synchronized with the internal clock of the signal processing unit 20. Accordingly, the sensor I/F 22 includes a buffer memory. The sensor I/F 22 writes the received data into the buffer memory in synchronization with the sensor driving clock. Subsequently, the sensor I/F 22 reads out the data from the buffer memory in synchronization with the system clock.

The detection correcting unit 23 performs a variety of correction processes (e.g., a defect correction process and a lens correction process) on the supplied raw data. In addition, the detection correcting unit 23 performs a detection process for adjusting a black level, focus, exposure, white balance.

The signal processing sub-unit 24A converts the raw data into an imaging signal having a format suitable for the downstream processing of a moving image. For example, the signal processing sub-unit 24A performs demosaic processing on the raw data so as to generate a Y/C signal including a luminance signal Y and a color difference signal Cb/Cr. In addition, the signal processing sub-unit 24A performs predetermined processing, such as white balance processing, gamma correction processing, and an unsharp mask processing.

The resolution conversion unit 25A converts the resolution of baseband moving image data into a resolution suitable for a display unit 30 described below or a resolution suitable for a recording mode. As used herein, the term "baseband data" refers to data obtained by converting a signal of an analog format to a digital format before being subjected to various processing, such as compression encoding and modulation. In this example, a digital imaging signal obtained by converting an analog signal output from the image pickup element 11 into a digital signal by means of the front-end unit 12 is appropriately referred to as "baseband data".

The signal processing sub-unit 24B converts the raw data into an imaging signal having a format suitable for the downstream processing of a still image. For example, the signal processing sub-unit 24B performs demosaic processing on the raw data so as to generate a Y/C signal including a luminance signal Y and a color difference signal Cb/Cr. In addition, the signal processing sub-unit 24B performs predetermined processing, such as white balance processing, gamma correction processing, and an unsharp mask processing.

The resolution conversion unit 25B converts the resolution of baseband still image data into a resolution suitable for the display unit 30 described below or a resolution suitable for a recording mode.

Note that signal processing performed on still image data by the signal processing sub-unit 24B and the resolution conversion unit 25B is not necessarily performed in real time. Accordingly, the signal processing may be executed at low speed through a software process performed by the CPU 31 or a process performed by a general-purpose digital signal processor (DSP).

The extended image processing unit 26 performs extended image processing, such as an object recognition process or a super high-speed continuous shooting process. In the object recognition process, for example, a sub-image of a face is extracted from the image using a pre-learned pattern dictionary. In the super high-speed continuous shooting process, electrical charge in the image pickup element 11 is read out at a significantly high frame rate of, for example, 240 fps (frames per second) for a moving image, as compared with a normal frame rate of 60 fps. A high-speed data transfer capability is necessary for a super high-speed continuous shooting function, as compared with a normal moving image shooting function. Accordingly, it is desirable that a dedicated processing unit is provided for the super high-speed continuous shooting function.

The still image codec unit 27 performs a compression encoding process on baseband still image data and a decoding process on compression-encoded still image data. Any type of compression encoding method can be employed. For example, a JPEG (joint photographic expert group) encoding method may be employed. That is, the still image codec unit 27 separates a supplied still image frame into encoded blocks each having a predetermined size (e.g., 8-by-8 pixels) and performs discrete cosine transform (DCT) for each of the encoded blocks. Thereafter, the still image codec unit 27 quantizes, using a predetermined quantizer scale, a DCT coefficient obtained through the DCT. The quantized data is further compressed using variable length coding, such as Huffman encoding, and is output. The decoding process of the compressed still image data performed by the still image codec unit 27 is a process that is the reverse of the compression-encoding process.

The moving image codec unit 28 performs a compression-encoding process on baseband moving image data and a decoding process on compression-encoded moving image data. Any type of compression encoding method can be employed. For example, an MPEG 2 (Moving Picture Expert group 2) encoding method, ITU-T (international telecommunication union-telecommunication standardization rector) recommendation H.264 encoding method, or ISO (international organization for standardization)/IEC (international electrotechnical commission) International Standard 14496-10 (MPEG-4 part 10) Advanced Video Coding method (hereinafter referred to as "H.264" or "AVC") may be employed. In the present embodiment, the moving image codec unit 28 employs the MPEG 2 encoding method.

For example, the moving image codec unit 28 separates a frame of the supplied moving image data into encoded blocks each having a predetermined size (e.g., 8-by-8 pixels) and performs discrete cosine transform (DCT) for each of the encoded blocks. Thereafter, the moving image codec unit 28 quantizes, using a predetermined quantizer scale, a DCT coefficient obtained through the DCT. In addition, the moving image codec unit 28 performs encoding using motion-compensated prediction between frames. The intra-frame coded and inter-frame coded data is further compressed using variable length coding, such as Huffman encoding, and is output. The decoding process of the compressed moving image data performed by the moving image codec unit 28 is a process that is the reverse of the compression-encoding process.

The display control unit 29 converts supplied image data into a signal having a format displayable on the display unit 30. For example, the display unit 30 is formed from a liquid crystal display (LCD). The display unit 30 is used for a viewfinder of the image pickup apparatus 1. The display unit 30 is further used for a monitor for monitoring an image stored in the recording medium 38 and played back. Under the control of instructions supplied from the CPU 31 described below, the display control unit 29 generates a display signal for displaying characters and figures on the display unit 30. The display unit 30 further displays an image based on the display signal. For example, the display unit 30 displays a variety of setting screens used for setting the image pickup apparatus 1, information indicating the modes of the image pickup apparatus 1, and a cursor in a predetermined manner.

A read only memory (ROM) 32 and an input device 33 are connected to the CPU 31. The CPU 31 uses a random access memory (RAM) (not shown) as a work memory so as to perform overall control of the image pickup apparatus 1 in accordance with the instructions of a program prestored in the ROM 32.

For example, the CPU 31 communicates a command and data with the blocks of the signal processing unit 20 via the bus 21 so as to control the blocks of the signal processing unit 20. In addition, the CPU 31 generates control signals for controlling focusing, an aperture, and zooming of the optical system 10 on the basis of control signals and an imaging signal in accordance with the operations performed on the input device 33. The CPU 31 then supplies the generated control signals to the drive unit 13. The drive unit 13 controls the blocks of the optical system 10 in accordance with the supplied control signals. Furthermore, the CPU 31 submits a command to the timing generator 14 so that the timing generator 14 outputs a predetermined clock pulse.

The timing generator 14 generates timing signals necessary for processing the imaging signal output from the image pickup element 11 in accordance with the commands supplied from the CPU 31. Examples of the timing signals include a frame synchronization signal, a horizontal synchronization signal, and a vertical synchronization signal.

The input device 33 includes a variety of operating members used for operating the image pickup apparatus 1. The input device 33 outputs a control signal corresponding to an operation performed on one of the operating members. For example, the input device 33 includes a power key used for switching on an off the power supplied from a power supply unit 40, a mode switch key used for switching between the operation modes of the image pickup apparatus 1, such as an image capturing mode and a recording mode, and a key used for moving a cursor. In addition, the input device 33 includes a shutter button used for capturing a still image with the image pickup apparatus 1 and an operating member used for changing focusing, an aperture, and zooming of the optical system 10 when a still image or a moving image is captured.

The external I/F 34 controls exchange of data between the image pickup apparatus 1 and an external apparatus.

The RAM 36 is connected to the memory controller 35. For example, the RAM 36 is formed from a synchronous dynamic random-access memory (SDRAM) operating in synchronization with a memory bus clock. The RAM 36 can perform data input and output with a predetermined data length (a burst length) using burst transfer. The RAM 36 is also used by the units connected to the bus 21. The memory controller 35 performs access control to the RAM 36. When a transfer request of data to the RAM 36 is issued from one of the processing blocks connected to the bus 21, the data transfer request is delivered from the bus 21 to the memory controller 35. The memory controller 35 performs an access operation to the RAM 36 in response to the data transfer request.

The recording and playback control unit 37 performs control for recording data into the recording medium 38 and control for playing back data recorded in the recording medium 38. An example of the recording medium 38 is a removable nonvolatile memory. Alternatively, a recordable optical disk may be used for the recording medium 38. Still alternatively, a removable hard disk or a hard disk incorporated in the image pickup apparatus 1 may be used for the recording medium 38. It is noted that an existing magnetic tape used for recording moving image data may be used for the recording medium 38.

As described above, according to an embodiment of the present invention, the signal processing sub-unit and the resolution conversion sub-unit provided in the signal processing unit 20 are separated into the signal processing sub-unit 24A and the resolution conversion unit 25A used for a monitoring operation for adjusting the angle of view before an image is actually captured and moving image processing and the signal processing sub-unit 24B and the resolution conversion unit 25B used for still image processing.

Figure 2:
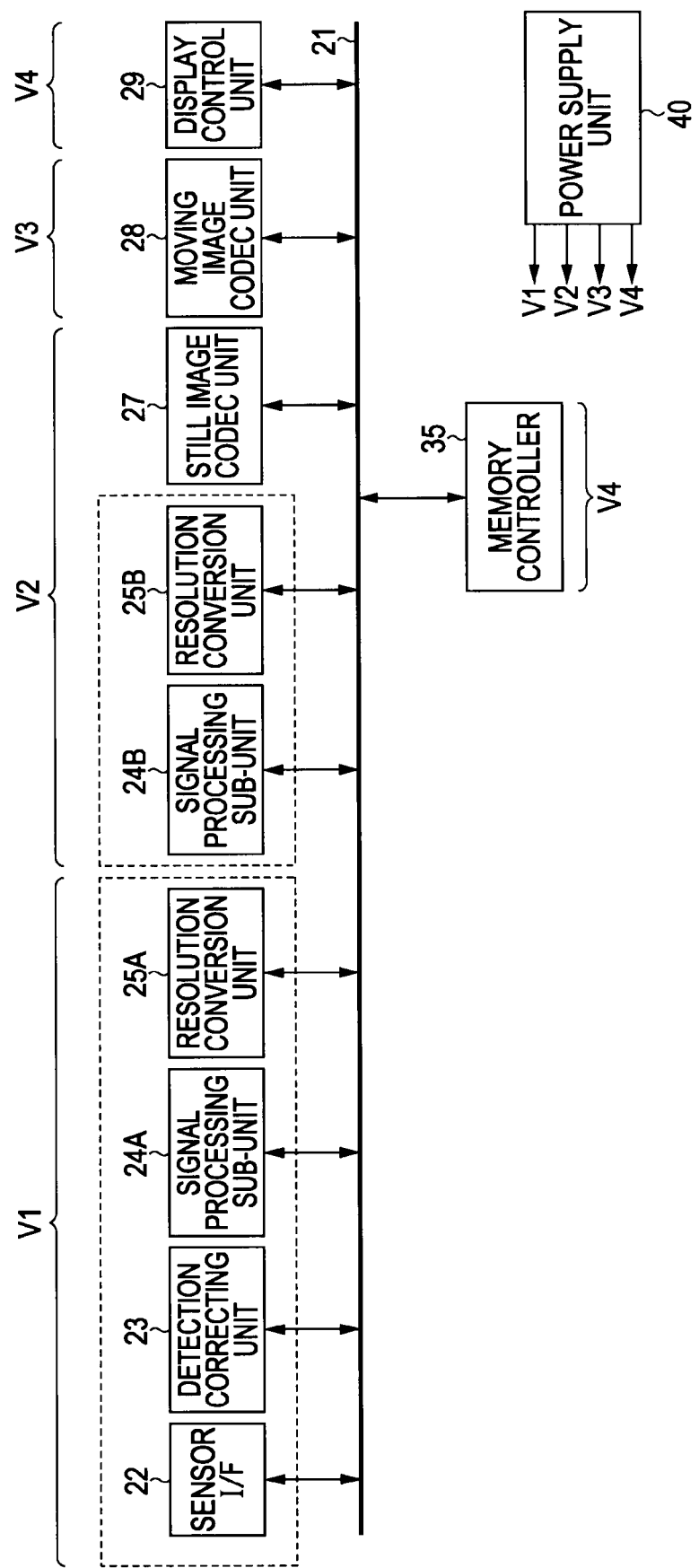
FIG. 2 is a block diagram illustrating power supplied to each processing block of the image pickup apparatus.

In addition, according to the embodiment of the present invention, processing blocks that carry out a monitoring operation used for adjusting the angle of view before an image is actually captured, moving image processing, and still image processing are separately provided in a hierarchical fashion. In addition, power can be independently supplied to the individual processing blocks. For example, as shown in FIG. 2, four power supply voltages V1, V2, V3, and V4 are provided from the power supply unit 40 to the processing blocks of the signal processing unit 20. Thereafter, the CPU 31 performs on and off control of the four individual power supply voltages V1, V2, V3, and V4 in accordance with the various processing.

The power supply voltage V1 is power provided during an operation mode in which it is necessary for the image pickup element 11 to operate. That is, in an operation mode in which image capturing using the image pickup element 11 is not necessary (e.g., during playback of a still image or a moving image), the power supply voltage V1 is not provided. The power supply voltage V1 is to be provided to the sensor I/F 22, the detection correcting unit 23, the signal processing sub-unit 24A, and the resolution conversion unit 25A.

The power supply voltage V2 is power provided during an operation mode in which a still image is processed (e.g., during recording of a still image or playback of a still image). The power supply voltage V2 is to be provided to the signal processing sub-unit 24B, the resolution conversion unit 25B, and the still image codec unit 27. The power supply voltage V3 is power provided during an operation mode in which a moving image is processed (e.g., during recording of a moving image or playback of a moving image). The power supply voltage V3 is to be provided to the moving image codec unit 28. The power supply voltage V4 is power provided at all times regardless of the operation mode. The power supply voltage V4 is provided to the display control unit 29 and the memory controller 35. Although not shown, according to the present embodiment, the power supply voltage V4 is also provided to the CPU 31, the RAM 36, and the display unit 30.

For example, the power supply voltages V1, V2, V3, and V4 provided to the processing blocks may be supplied from the power supply unit 40 to the signal processing unit 20 through different routes. In such a case, the power supply voltages V1, V2, V3, and V4 supplied through the different routes may be different in accordance with the operation mode or may be the same. Alternatively, for example, the power supplied from the power supply unit 40 to the signal processing unit 20 through one route may be separated into a plurality of routes in the signal processing unit 20. Thus, the same power may be appropriately supplied to the processing blocks.

An exemplary operation of the image pickup apparatus 1 having such a configuration is schematically described below. In the following description, the operation in a monitoring mode in which the angle of view is adjusted when a still image is captured and the operations in a still image recording mode and a moving image recording mode are illustrated.

(1) Monitoring Mode

Figure 3:
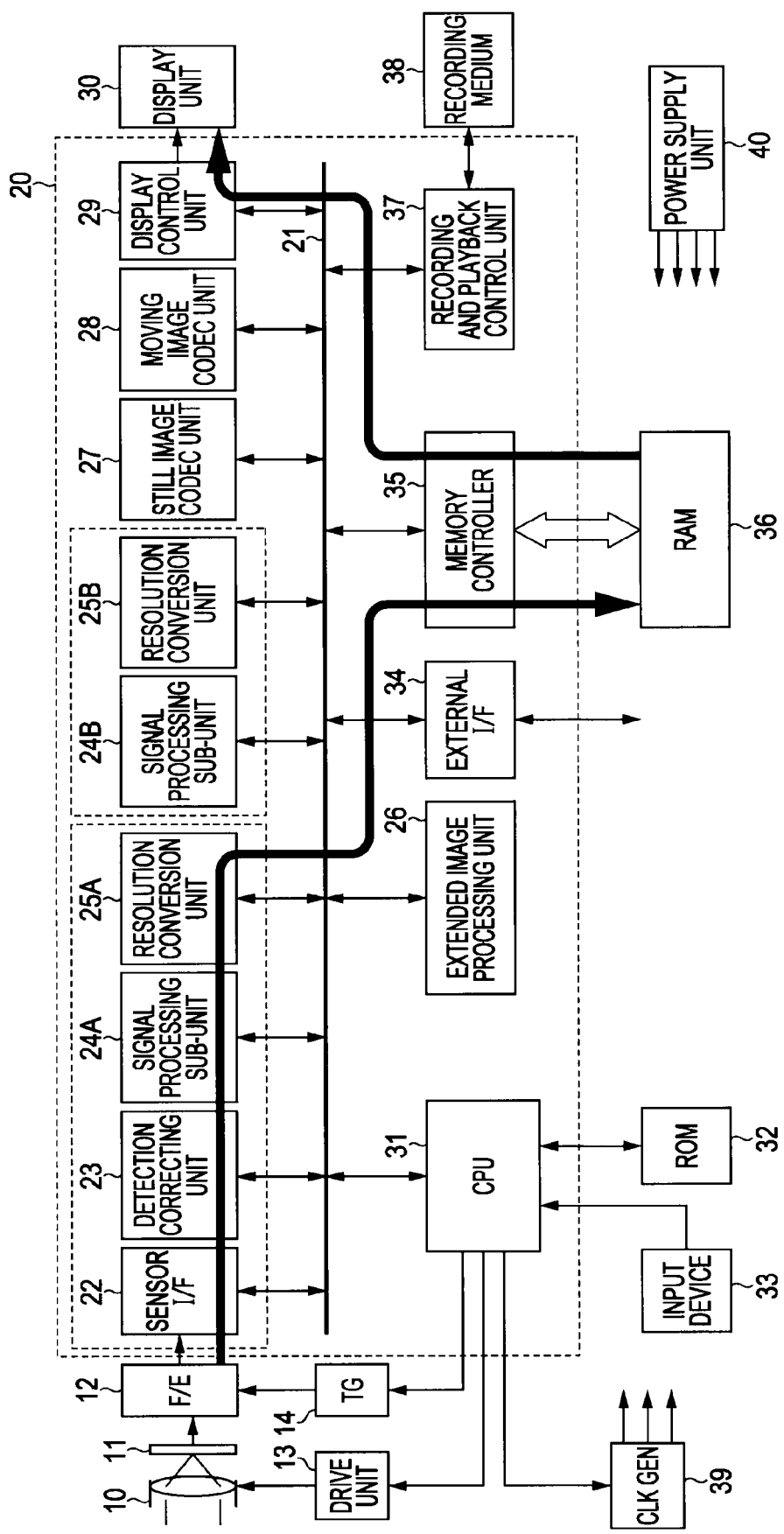
FIG. 3 is a block diagram schematically illustrating an exemplary operation performed by the image pickup apparatus in a monitoring mode, according to the first embodiment of the present invention.

The operation performed by the image pickup apparatus 1 according to the present embodiment in a monitoring mode is described next. As shown in FIG. 3, in a monitoring mode, light output from an object is made incident on the image pickup element 11 through the optical system 10. The light is photoelectrically converted to an electrical signal serving as an imaging signal. The imaging signal is output at the frame intervals. The imaging signal is subjected to predetermined processes, such as a noise reduction process and a gain control process, performed by the front-end unit 12. Thereafter, the imaging signal is A/D-converted into raw data. The raw data is output at the frame intervals. The raw data output from the front-end unit 12 is input to the signal processing unit 20 and is supplied to the sensor I/F 22.

The sensor I/F 22 writes the raw data into a buffer memory in synchronization with the sensor driving clock. Thereafter, the raw data is read out from the buffer memory in synchronization with the system clock. Thus, the clock used is changed. The raw data to be processed in the new clock is subjected to a variety of processes performed by the detection correcting unit 23. The raw data is then supplied to the signal processing sub-unit 24A, where the raw data is converted to baseband moving image data and is supplied to the resolution conversion unit 25A. The resolution of the moving image data supplied to the resolution conversion unit 25A is converted into a resolution suitable for, for example, the display operation performed by the display unit 30. The moving image data having the resolution converted by the resolution conversion unit 25A is supplied to the memory controller 35 via the bus 21 and is written to the RAM 36.

The moving image data written to the RAM 36 is read out from the RAM 36 in a predetermined manner. Subsequently, the moving image data is supplied to the display control unit 29 via the bus 21. Finally, the moving image data is displayed on the display unit 30 so as to serve as a monitoring image.

Figure 4:
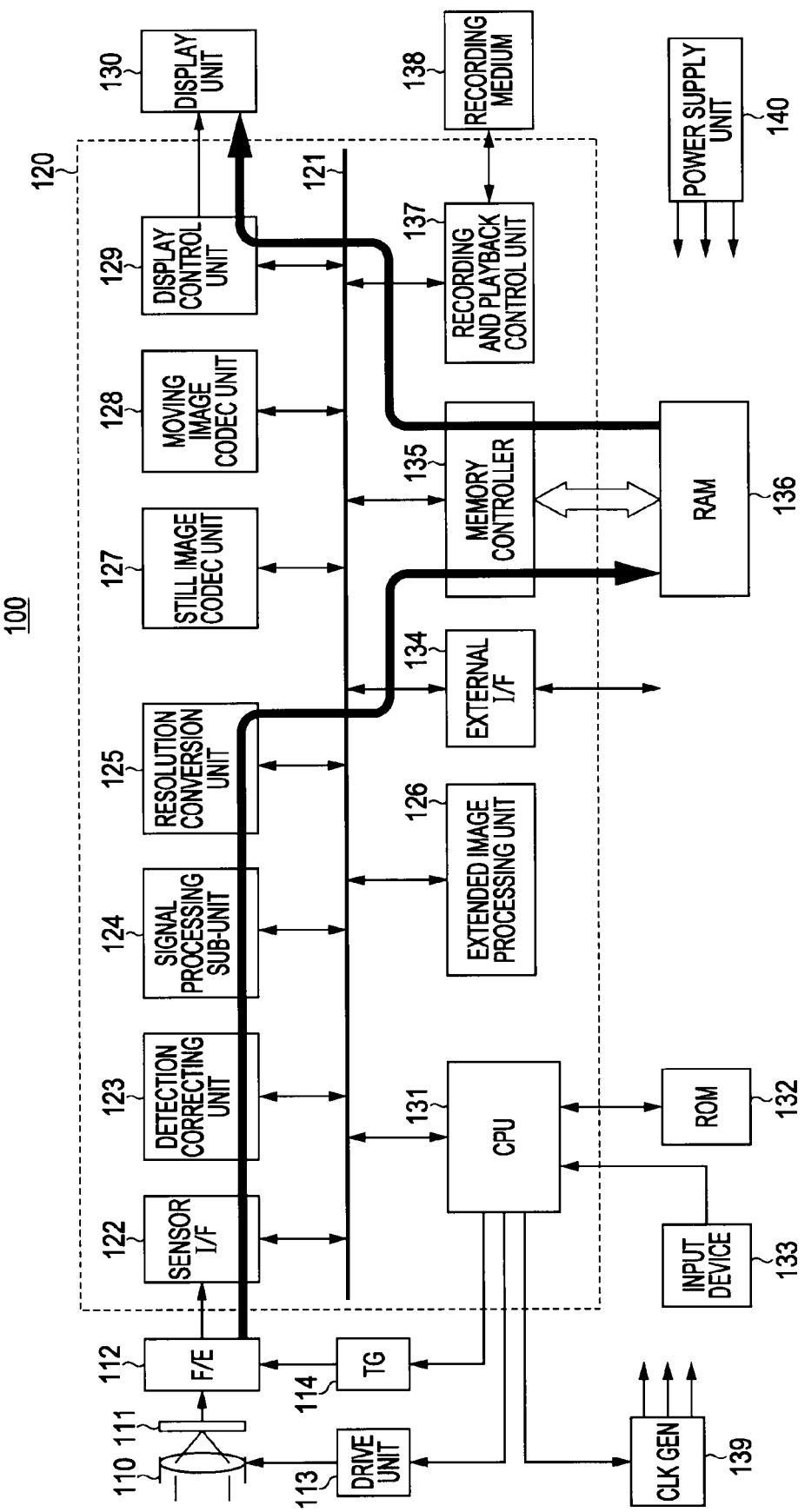
FIG. 4 is a block diagram schematically illustrating an operation performed by an existing image pickup apparatus in a monitoring mode.

To facilitate an understanding of the operation performed by the image pickup apparatus 1 according to the present embodiment in a monitoring mode, the operation performed by the existing image pickup apparatus 100 in a monitoring mode is schematically described next. As shown in FIG. 4, in the monitoring mode of the existing image pickup apparatus 100, light output from an object is made incident on the image pickup element 111 through the optical system 110. The light is photoelectrically converted to an electrical signal serving as an imaging signal. The imaging signal is output at the frame intervals. The imaging signal is subjected to predetermined processes, such as a noise reduction process and a gain control process, performed by the front-end unit 112. Thereafter, the imaging signal is A/D-converted into raw data. The raw data is output at the frame intervals. The raw data output from the front-end unit 112 is input to the signal processing unit 120 and is supplied to the sensor I/F 122.

The sensor I/F 122 writes the raw data into a buffer memory in synchronization with the sensor driving clock. Thereafter, the raw data is read out from the buffer memory in synchronization with the system clock. Thus, the clock used is changed. The raw data to be processed in the new clock is subjected to a variety of processes performed by the detection correcting unit 123. The raw data is then supplied to the signal processing unit 124, where the raw data is converted to baseband moving image data and is supplied to the resolution conversion unit 125. The resolution of the moving image data supplied to the resolution conversion unit 125 is converted into a resolution suitable for, for example, the display operation performed by the display unit 130. The moving image data having the resolution converted by the resolution conversion unit 125 is supplied to the memory controller 135 via the bus 121 and is written to the RAM 136.

The moving image data written to the RAM 136 is read out from the RAM 136 in a predetermined manner. Subsequently, the moving image data is supplied to the display control unit 129 via the bus 121. Finally, the moving image data is displayed on the display unit 130 so as to serve as a monitoring image.

In the monitoring mode of the image pickup apparatus 1 according to the present embodiment, an image having a substantially video graphics array (VGA) size (i.e., 640 pixels (horizontal) by 480 pixels (vertical)) is processed. Accordingly, the image pickup apparatus 1 can be operated at a low clock frequency (e.g., about 30 MHz to about 40 MHz).

In contrast, in the monitoring mode of the existing image pickup apparatus 100, since the signal processing unit 124 and the resolution conversion unit 125 are designed so as to support processing for a still image in addition to a moving image, it is necessary that the image pickup apparatus 100 is operated at a clock frequency of, for example, about 100 MHz to about 150 MHz at which still image data having a size of several tens of megabytes can be processed.

Accordingly, in the monitoring mode of the image pickup apparatus 1 according to the present embodiment, the image pickup apparatus 1 can be operated at a frequency lower than that of the existing image pickup apparatus 100. As a result, the scale of a circuit of the image pickup apparatus 1 can be reduced, as compared with that of the existing image pickup apparatus 100. In addition, the circuit of the image pickup apparatus 1 can be operated with a lower driving voltage.

Furthermore, by separating power supply voltage supplied to the processing blocks and stopping supplying power supply voltages to the processing blocks that are not used in the monitoring mode (e.g., the power supply voltages V2 and V3 provided to the signal processing sub-unit 24B, the resolution conversion unit 25B, the still image codec unit 27, and the moving image codec unit 28), unnecessary power consumption can be eliminated, and a leakage current generated in an LSI can be reduced.

(2) Still Image Recording Mode

The operation performed by the image pickup apparatus 1 according to the present embodiment in a still image recording mode is described next. In general, still image recording is performed during monitoring of an image. For example, in order to instruct the image pickup apparatus 1 to record a still image, the shutter button provided in the input device 33 is first pressed during monitoring of an image. Then, a control signal corresponding to the pressing operation of the shutter button is supplied from the input device 33 to the CPU 31. In response to the control signal, the CPU 31 performs control so that the units of the image pickup apparatus 1 operate for recording a still image.

For example, a still image based on raw data acquired at a frame interval immediately after the shutter button was pressed is retrieved and recorded. That is, as shown in FIG. 5, raw data corresponding to a time at which the shutter button is pressed is output from the front-end unit 12 and is input to the signal processing unit 20. The raw data input to the signal processing unit 20 is supplied to the sensor I/F 22, which writes the raw data into a buffer memory in synchronization with a sensor driving clock. Subsequently, the raw data is read from the buffer memory in synchronization with a system clock. Thus, the clock used is changed. The raw data to be processed with the new clock is supplied to the memory controller 35 via the bus 21 and is stored in the RAM 36.

The raw data stored in the RAM 36 is read out from the RAM 36 at a predetermined timing and is supplied to the signal processing sub-unit 24B. The raw data supplied to the signal processing sub-unit 24B is converted into baseband still image data. Subsequently, the resolution of the still image data is converted by the resolution conversion unit 25B. The still image data is then supplied to the memory controller 35 via the bus 21 and is written into the RAM 36.

The raw data written into the RAM 36 is read in a predetermined manner and is supplied to the still image codec unit 27 via the bus 21. In the still image codec unit 27, the raw data is compression-encoded using, for example, a JPEG encoding method. The compressed still image data is supplied to the recording and playback control unit 37 via the bus 21 and is recorded in the recording medium 38.

In contrast, in the still image recording mode of the existing image pickup apparatus 100, for example, in order to instruct the image pickup apparatus 100 to record a still image, the shutter button provided as the input device 133 is first pressed during monitoring of an image. Then, a control signal corresponding to the pressing operation of the shutter button is supplied from the input device 133 to the CPU 131. In response to the control signal, the CPU 131 performs control so that the units of the image pickup apparatus 100 operate for recording a still image.

For example, a still image based on raw data acquired at a frame interval immediately after the shutter button is pressed is retrieved and recorded. That is, as shown in FIG. 6, raw data corresponding to a time at which the shutter button is pressed is output from the front-end unit 112 and is input to the signal processing unit 120. The raw data input to the signal processing unit 120 is supplied to the sensor I/F 122, which writes the raw data into a buffer memory in synchronization with a sensor driving clock. Subsequently, the raw data is read from the buffer memory in synchronization with a system clock. Thus, the clock used is changed. The raw data to be processed with the new clock is supplied to the memory controller 135 via the bus 121 and is stored in the RAM 136.

The raw data stored in the RAM 136 is read out from the RAM 136 at a predetermined timing and is supplied to the detection correcting unit 123. The raw data supplied to the detection correcting unit 123 is subjected to a variety of correction processes. The raw data is then supplied to the signal processing unit 124, where the raw data is converted into baseband still image data. Subsequently, the resolution of the still image data is converted by the resolution conversion unit 125. The still image data is then supplied to the memory controller 135 via the bus 121 and is written into the RAM 136.

The raw data written into the RAM 136 is read in a predetermined manner and is supplied to the still image codec unit 127 via the bus 121. In the still image codec unit 127, the raw data is compression-encoded using, for example, a JPEG encoding method. The compressed still image data is supplied to the recording and playback control unit 137 via the bus 121 and is recorded in the recording medium 138.

According to the present embodiment, the image pickup apparatus 1 includes the signal processing sub-unit 24A used for image processing performed in the monitoring mode and the signal processing sub-unit 24B used for image processing performed in the still image recording mode. Accordingly, the image processing performed in the monitoring mode can be executed simultaneously with the image processing performed in the still image recording mode.

Figure 7A:
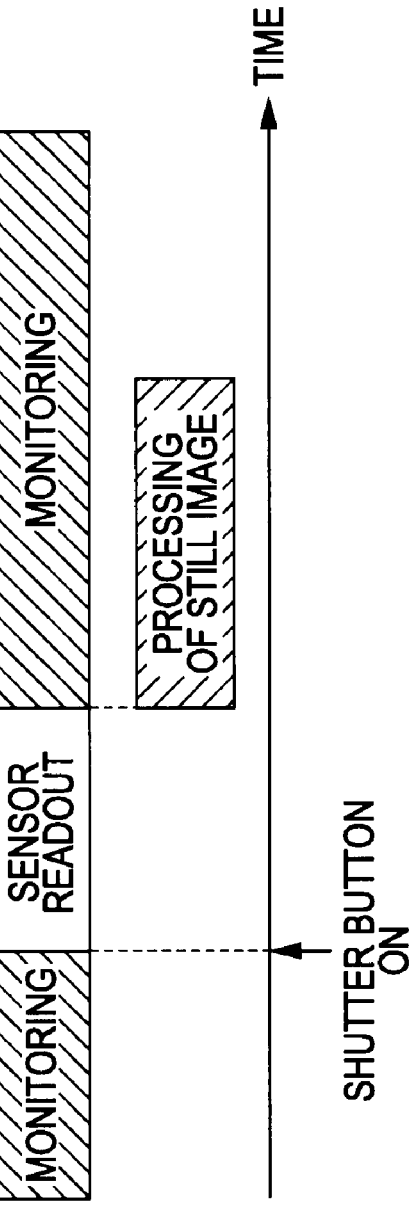
FIGS. 7A and 7B are diagrams schematically illustrating an exemplary operation performed by the image pickup apparatus in a still image recording mode.

For example, the case in which the shutter button is pressed during monitoring of an image and, subsequently, the image capturing of a still image is executed is discussed below. As shown in FIG. 7A, in the image pickup apparatus 1 according to the present embodiment, when the shutter button is pressed during monitoring of an image, still image data is read out using the optical system 10 and the front-end unit 12 and, subsequently, the still image processing is performed on the still image data by the signal processing sub-unit 24B.

At that time, since the still image processing is performed on the readout still image data by the signal processing sub-unit 24B, the monitoring operation can be simultaneously resumed using the signal processing sub-unit 24A without waiting for completion of the still image processing.

That is, according to the present embodiment, since the image pickup apparatus 1 displays a monitoring image on the display unit 30 so as to allow a user to adjust the angle of view for the next capture of a still image even when a still image is being processed, the next capture of a still image can be performed if the RAM 36 has available recording space.

Figure 7B:
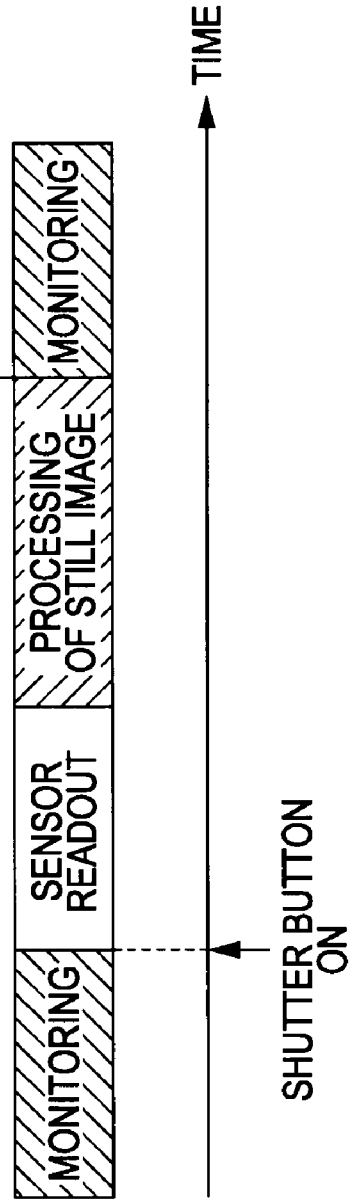

In contrast, as shown in FIG. 7B, in the existing image pickup apparatus 100, when the shutter button is pressed during monitoring of an image, still image data is read out using the optical system 110 and the front-end unit 112 and, subsequently, the still image processing is performed on the still image data by the signal processing unit 124. Subsequently, after the still image processing performed on the still image data has been completed, the monitoring operation is resumed.

That is, in the existing image pickup apparatus 100, since the signal processing unit 124 is used for the monitoring operation and the still image recording operation, a monitoring image is not displayed on the display unit 130 until the still image processing is completed. Thus, it is difficult for a user to adjust the angle of view for the next shot of a still image.

(3) Moving Image Recording Mode

The operation performed by the image pickup apparatus 1 according to the present embodiment in a moving image recording mode is described next. As shown in FIG. 8, in a moving image recording mode, light output from an object is made incident on the image pickup element 11 through the optical system 10. The light is photoelectrically converted to an electrical signal serving as an imaging signal. The imaging signal is output at the frame intervals. The imaging signal is subjected to predetermined processes, such as a noise reduction process and a gain control process, performed by the front-end unit 12. Thereafter, the imaging signal is A/D-converted into raw data. The raw data is output at the frame intervals. The raw data output from the front-end unit 12 is input to the signal processing unit 20 and is supplied to the sensor I/F 22.

The sensor I/F 22 writes the raw data into a buffer memory in synchronization with the sensor driving clock. Thereafter, the raw data is read out from the buffer memory in synchronization with the system clock. Thus, the clock used is changed. The raw data to be processed in the new clock is subjected to a variety of processes performed by the detection correcting unit 23. The raw data is then supplied to the signal processing sub-unit 24A, where the raw data is converted to baseband moving image data and is supplied to the resolution conversion unit 25A. The resolution of the moving image data supplied to the resolution conversion unit 25A is converted into a resolution suitable for, for example, the display operation performed by the display unit 30. The moving image data having the resolution converted by the resolution conversion unit 25A is supplied to the memory controller 35 via the bus 21 and is written to the RAM 36.

The moving image data written to the RAM 36 is read out from the RAM 36 in a predetermined manner. Subsequently, the moving image data is supplied to the moving image codec unit 28 via the bus 21. The moving image codec unit 28 performs compression-encoding using, for example, an MPEG 2 encoding method. The compressed moving image data is supplied to the memory controller 35 via the bus 21 and is written into the RAM 36.

Note that the moving image data having a resolution converted by the resolution conversion unit 25A may be supplied to the extended image processing unit 26 via the bus 21 and, subsequently, image processing may be performed on the moving image data.

When a predetermined amount or more of compressed moving image data has accumulated in the RAM 36, the recording and playback control unit 37 reads out the compressed moving image data from the RAM 36 in units of recording of the recording medium 38 and stores the readout compressed moving image data in the recording medium 38.

Figure 9:
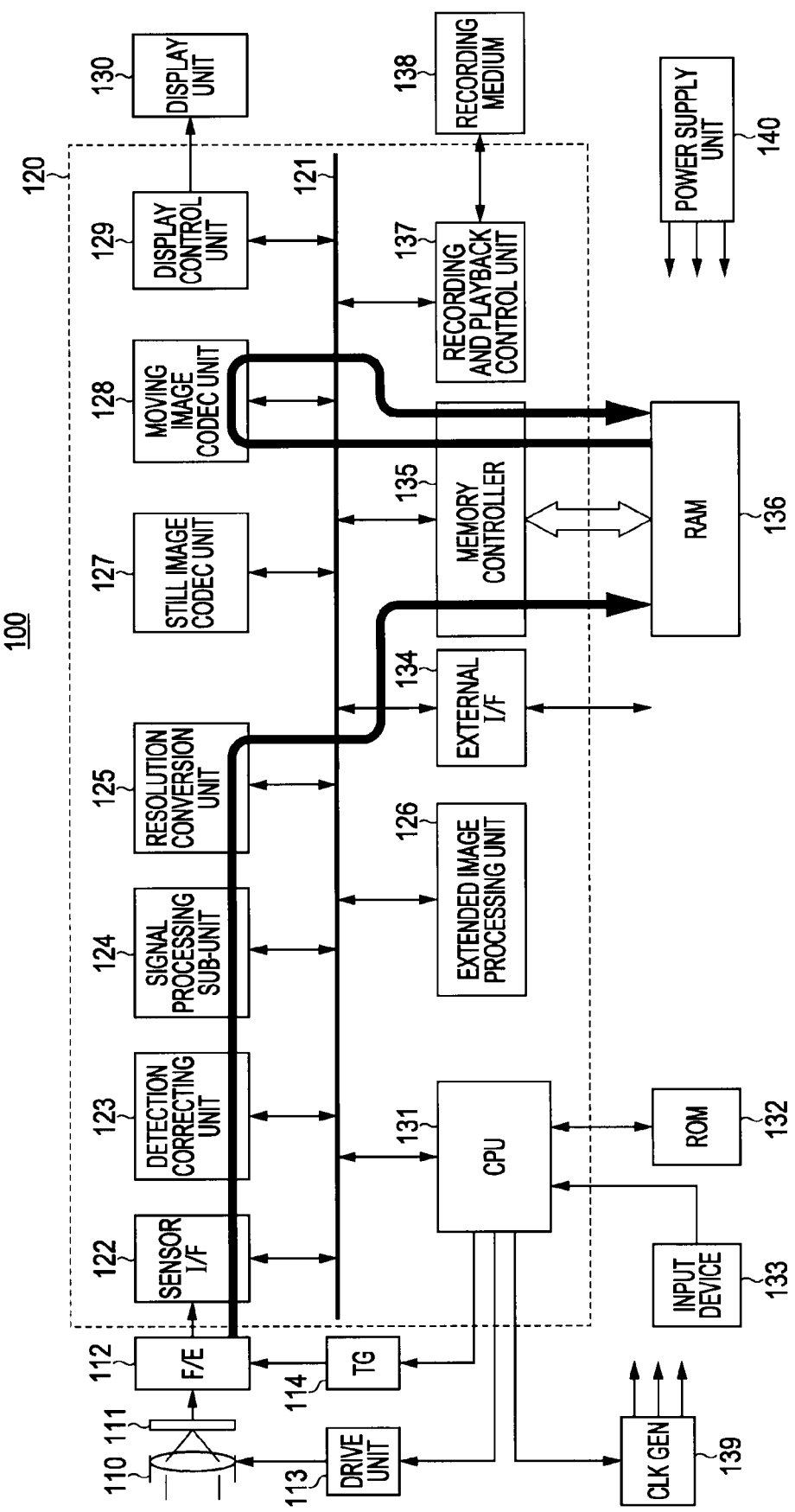
FIG. 9 is a block diagram schematically illustrating an operation performed by an existing image pickup apparatus in a moving image recording mode.

In contrast, in the moving image recording mode of the existing image pickup apparatus 100, as shown in FIG. 9, light output from an object is made incident on the image pickup element 111 through the optical system 110. The light is photoelectrically converted to an electrical signal serving as an imaging signal. The imaging signal is output at each frame interval. The imaging signal is subjected to predetermined processes, such as a noise reduction process and a gain control process, performed by the front-end unit 112. Thereafter, the imaging signal is A/D-converted into raw data. The raw data is output at the frame intervals. The raw data output from the front-end unit 112 is input to the signal processing unit 120 and is supplied to the sensor I/F 122.

The sensor I/F 122 writes the raw data into a buffer memory in synchronization with the sensor driving clock. Thereafter, the raw data is read out from the buffer memory in synchronization with the system clock. Thus, the clock used is changed. The raw data to be processed in the new clock is subjected to a variety of processes performed by the detection correcting unit 123. The raw data is then supplied to the signal processing unit 124, where the raw data is converted to baseband moving image data and is supplied to the resolution conversion unit 125. The resolution of the moving image data supplied to the resolution conversion unit 125 is converted into a resolution suitable for, for example, the display operation performed by the display unit 130. The moving image data having the resolution converted by the resolution conversion unit 125 is supplied to the memory controller 135 via the bus 121 and is written into the RAM 136.

The moving image data written to the RAM 136 is read out from the RAM 136 in a predetermined manner. Subsequently, the moving image data is supplied to the moving image codec unit 128 via the bus 121. The moving image codec unit 128 performs compression-encoding using, for example, an MPEG 2 encoding method. The compressed moving image data is supplied to the memory controller 135 via the bus 121 and is written to the RAM 136.

When a predetermined amount or more of compressed moving image data has accumulated in the RAM 136, the recording and playback control unit 137 reads out the compressed moving image data from the RAM 136 in units of recording of the recording medium 138 and stores the readout compressed moving image data in the recording medium 138.

According to the present embodiment, the image pickup apparatus 1 includes the signal processing sub-unit 24A used for image processing performed in the moving image recording mode and the signal processing sub-unit 24B used for image processing performed in the still image recording mode. Accordingly, the image processing performed in the moving image recording mode can be executed simultaneously with the image processing performed in the still image recording mode.

Figure 10A:
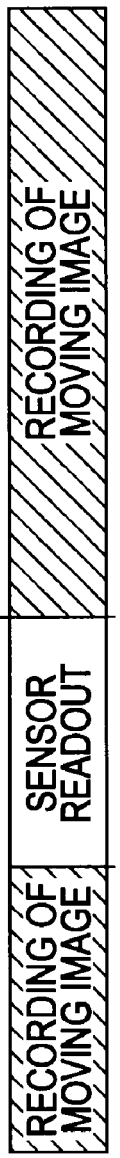
FIGS. 10A and 10B are diagrams schematically illustrating an exemplary operation performed by the image pickup apparatus in a moving image recording mode.

For example, the case in which the shutter button is pressed during recording of a moving image and, thus, a still image is captured is discussed below. As shown in FIG. 10A, in the image pickup apparatus 1 according to the present embodiment, when the shutter button is pressed during recording of a moving image, still image data is read out using the optical system 10 and the front-end unit 12 and, subsequently, the still image processing is performed on the still image data by the signal processing sub-unit 24B.

At that time, since the still image processing is performed on the readout still image data by the signal processing sub-unit 24B, the moving image recording operation can be simultaneously resumed using the signal processing sub-unit 24A without waiting for completion of the still image processing. That is, according to the present embodiment, the image pickup apparatus 1 can even perform a moving image recording operation simultaneously with performance of still image processing.

Figure 10B:

In contrast, as shown in FIG. 10B, in the existing image pickup apparatus 100, when the shutter button is pressed during monitoring of an image, still image data is read out using the optical system 110 and the image pickup element 111 and, subsequently, the still image processing is performed on the still image data by the signal processing unit 124. Subsequently, after the still image processing performed on the still image data has been completed, the moving image recording operation is resumed.

That is, in the existing image pickup apparatus 100, since the signal processing unit 124 is used for the moving image recording operation and the still image recording operation, a moving image recording operation is not performed until the still image processing is completed.

Figure 11:
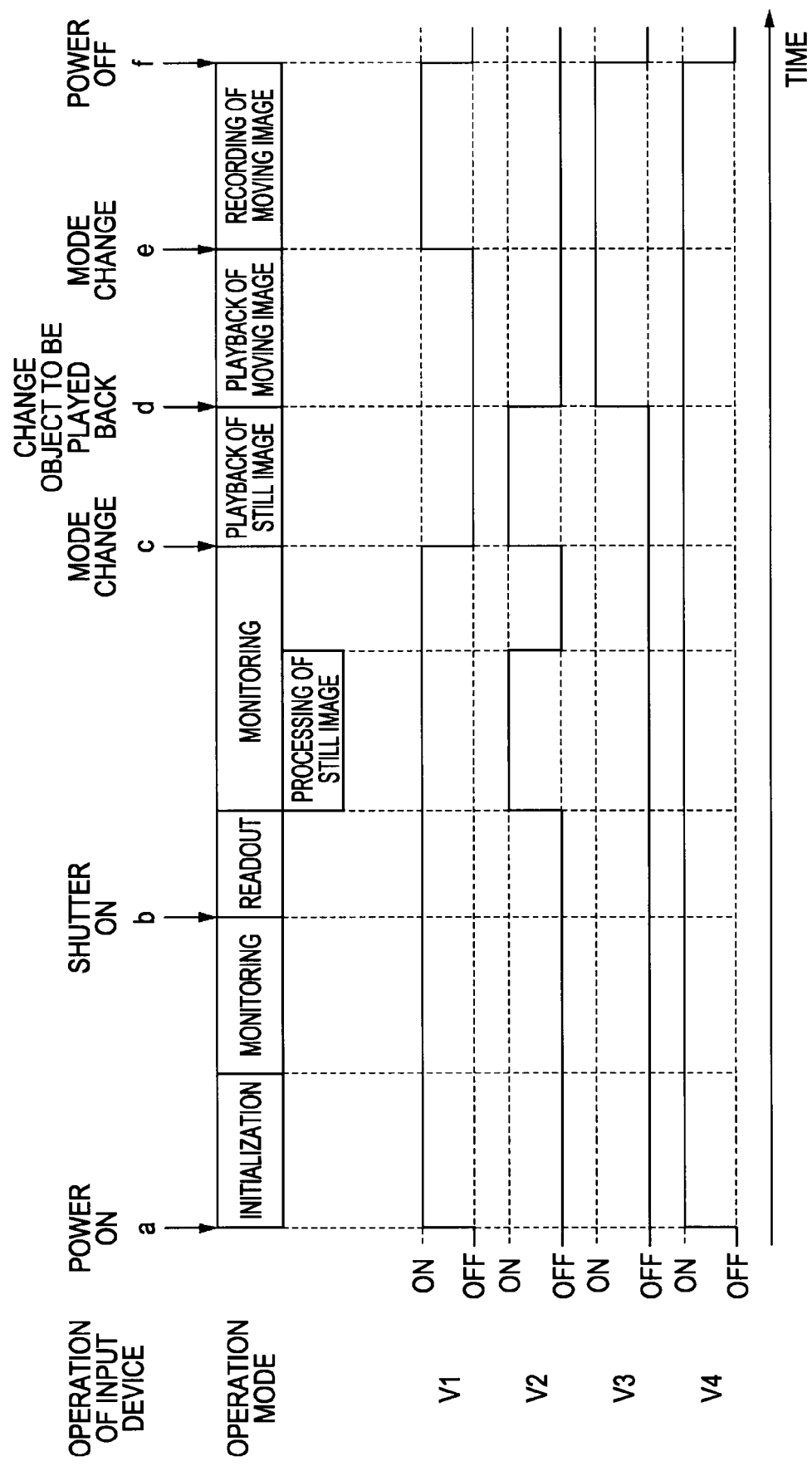
FIG. 11 is a diagram schematically illustrating a control sequence of power supply voltages.
Figure 14:
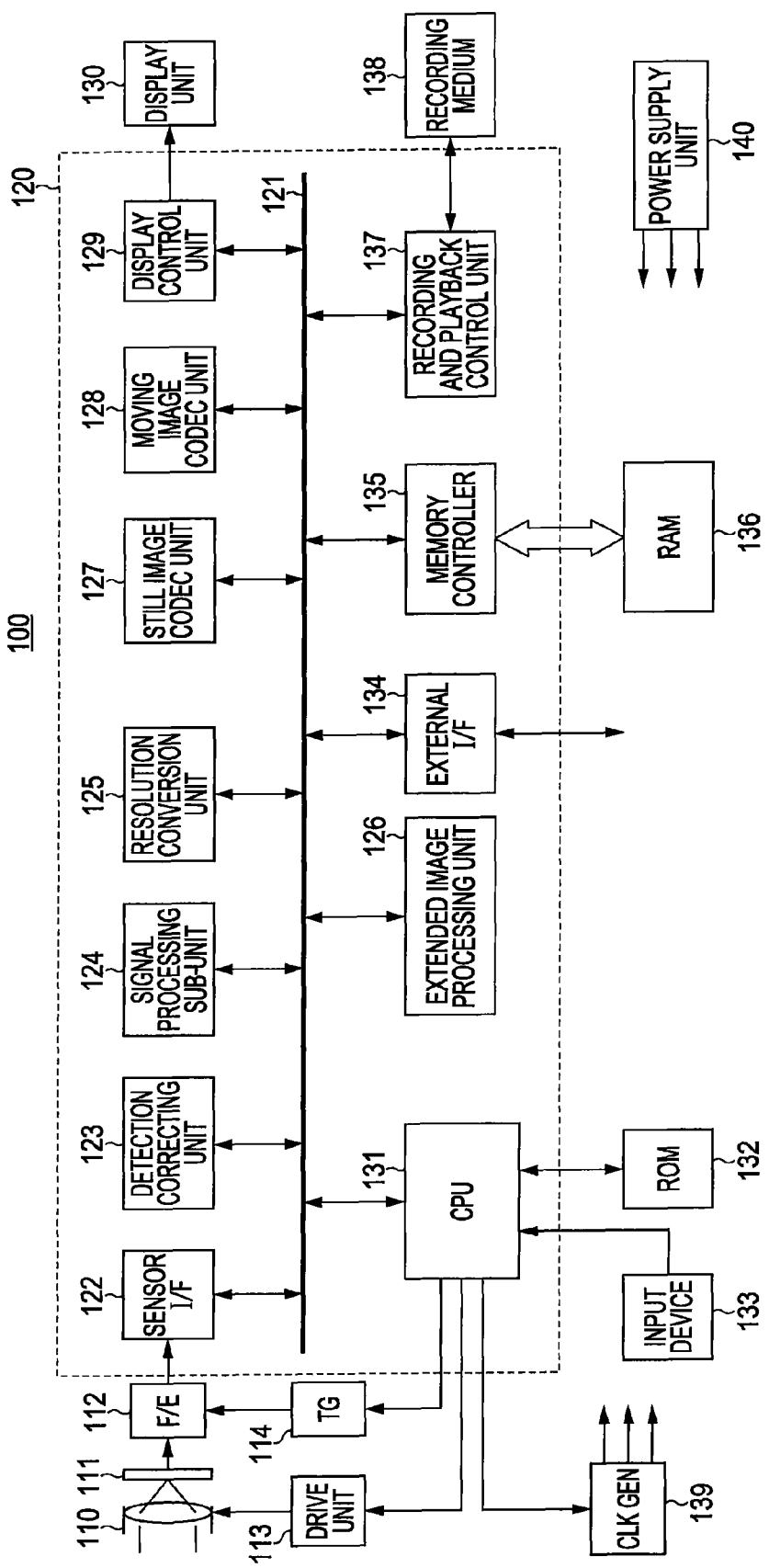
FIG. 14 is a block diagram illustrating an exemplary configuration of an existing image pickup apparatus.

The control sequence of the power supply voltages V1, V2, V3, and V4 in each of the operation modes is described next. Hereinafter, as shown in FIG. 11, the following case is discussed: the image pickup apparatus 1 is powered on, a still image is captured during monitoring of an image, a still image and a moving image pre-recorded in the recording medium 38 are played back, and a moving image is captured.

At a time a, the power key provided in the input device 33 is operated, and therefore, the image pickup apparatus 1 is powered on. The image pickup apparatus 1 starts in a monitoring mode. Under the control of the CPU 31, the power supply voltages V1 and V4 are supplied. Subsequently, the processing blocks used for the monitoring process, such as the entire system, the lens system, and the sensor system, are initialized. After the initialization is completed, a monitoring image is displayed on the display unit 30. In this way, the image pickup apparatus 1 is ready for capturing an image.

At a time b, if the shutter button provided in the input device 33 is operated, the operation mode is switched to a still image recording mode. An exposure operation performed by the image pickup element 11 is started, and a still image is captured. Still image data based on raw data acquired at a frame interval immediately after the shutter button is pressed is read out. Under the control of the CPU 31, the power supply voltage V2 is provided, and therefore, the still image processing is started. In addition, when the still image processing is started, the operation mode is returned to a monitoring mode. Thus, an image can be captured again. If the next image capturing operation is not performed when the still image processing is completed, supply of the power supply voltage V2 is stopped. In this way, consumption of a standby current due to the power supply voltage V2 can be prevented.

At a time c, if the mode switch key provided in the input device 33 is operated so that a still image playback mode is selected during a monitoring operation, supply of the power supply voltage V1 is stopped under the control of the CPU 31. At the same time, the power supply voltage V2 is provided. If a certain still image data item is selected from among still image data items pre-recorded in the recording medium 38, a still image playback process for the selected still image data item is started. Thus, the selected still image data item is displayed on the display unit 30.

At a time d, if the mode selection key is operated and an item to be played back is switched from a still image to a moving image, the operation mode is switched to a moving image playback mode. Subsequently, under the control of the CPU 31, supply of the power supply voltage V2 is stopped, and the power supply voltage V3 is provided. Thereafter, if a certain moving image data item is selected from among moving image data items pre-recorded in the recording medium 38, a moving image playback process for the selected moving image data item is started. Thus, the selected moving image data item is displayed on the display unit 30.

At a time e, if the mode selection key is operated and a moving image recording mode is selected, the power supply voltage V1 is provided under the control of the CPU 31. Thus, a moving image recording process is started. At a time f, if the power key is operated and the image pickup apparatus 1 is powered off, the currently executing operations are completed. In addition, necessary program memories are backed up and, under the control of the CPU 31, supply of the power supply voltages V1, V2, V3, and V4 is stopped.

FIG. 12 illustrates a relationship among the settings of the power supply voltages V1, V2, V3, and V4 in each of the operation modes, the driving voltage of the power supply, and the clock frequency. The items "V1", "V2", "V3", and "V4" represent the ON/OFF state of the power supply voltages V1, V2, V3, and V4 in each of the operation modes. In the monitoring mode, the power supply voltages V1 and V4 are set to "ON", while the power supply voltages V2 and V3 are set to "OFF". When still image data is read in the still image recording mode, the power supply voltages V1 and V4 are set to "ON", while the power supply voltages V2 and V3 are set to "OFF". When still image data is processed in the still image recording mode, the power supply voltages V1 and V2 are set to "ON", while the power supply voltages V3 and V4 are set to "OFF".

In addition, in the still image playback mode, the power supply voltages V2 and V4 are set to "ON", while the power supply voltages V1 and V3 are set to "OFF". In the moving image recording mode, the power supply voltages V1, V3, and V4 are set to "ON", while the power supply voltage V2 is set to "OFF". In the moving image playback mode, the power supply voltages V3 and V4 are set to "ON", while the power supply voltages V1 and V2 are set to "OFF".

The item "driving voltage #1" represents the levels of the power supply voltages V1, V2, V3, and V4 when these voltages are independently controlled. Since the power supply voltage V1 is supplied to the blocks that perform a variety of processes on an imaging signal acquired from the image pickup element (i.e., the sensor I/F 22, the detection correcting unit 23, the signal processing sub-unit 24A, and the resolution conversion unit 25A), the level of the power supply voltage V1 is substantially low or medium in order to drive the blocks. Since the power supply voltage V2 is supplied to the blocks that perform still image processing (i.e., the signal processing sub-unit 24B, the resolution conversion unit 25B, and the still image codec unit 27), the level of the power supply voltage V2 is substantially high in order to drive the blocks.

Since the power supply voltage V3 is supplied to the block that performs moving image processing (i.e., the moving image codec unit 28), the level of the power supply voltage V3 is substantially medium in order to drive the block. Since the power supply voltage V4 is supplied to the blocks that use power at all times (i.e., the CPU 31, the display control unit 29, and the memory controller 35), the level of the power supply voltage V4 is substantially medium in order to drive the blocks.

The item "clock frequency" represents the level of the clock frequency in each of the operation modes when the levels of the power supply voltages V1, V2, V3, and V4 are controlled so as to be the same. In the monitoring mode, since the manipulated image size corresponds to VGA, the level of the clock frequency is low.

In the still image recording mode (during readout of still image data), since still image data having a size of several tens of megabytes is read out, the level of the clock frequency is medium. In addition, in the still image recording mode (during processing of an image) and the still image playback mode, since still image data having a size of several tens of megabytes is processed, the level of the clock frequency is high. In the moving image recording mode and the moving image playback mode, since moving image data is processed, the level of the clock frequency is medium.

The item "driving voltage #2" represents the levels of the power supply voltages V1, V2, V3, and V4 in each of the operation modes when the levels of the power supply voltages V1, V2, V3, and V4 are controlled so as to be the same. In the monitoring mode, since the manipulated image size corresponds to a substantially VGA size, the driving voltage having a level that is substantially low is necessary.

In the still image recording mode (during readout of still image data), since still image data having a size of several tens of megabytes is read out, the level of the clock frequency is medium. In addition, in the still image recording mode (during processing of an image) and the still image playback mode, since still image data having a size of several tens of megabytes is processed, the driving voltage having a level that is substantially high is necessary. In the moving image recording mode and the moving image playback mode, since moving image data is processed, the driving voltage having a level that is substantially medium is necessary.

In this case, the voltages for the item "driving voltage #2" may be determined in accordance with the clock frequency. For example, when a clock frequency necessary for an operation mode is high, a high driving voltage is necessary. In contrast, when a clock frequency necessary for an operation mode is low, the driving voltage is set to low.

According to an embodiment of the present invention, by controlling supply of a clock to each of the processing blocks in addition to controlling a power supply voltage provided to each of the processing blocks, the power consumption can be reduced. For example, much time is necessary before playback is started when the operation mode is switched to a playback mode, such as the still image playback mode or the moving image playback mode, a data item to be played back is selected, and the selected data to be played back is subjected to image processing. After the operation mode is switched to a playback mode, it is difficult to determine which data item is to be selected. Therefore, in general, before a data item to be played back is selected, the data items are read out from a memory, and processing necessary for playback of the data items is performed in advance. In this way, the time necessary before playback of the selected data item is started is reduced.

However, it is difficult for the processing necessary for playback of a data item to be performed in advance if, as described above, power supply to a block unnecessary for the current operation mode is stopped, and power is supplied to processing blocks necessary for a playback mode after the operation mode has been switched to the playback mode.

Accordingly, power is supplied to processing blocks necessary for the playback processing at all times. Subsequently, by controlling supply of clocks to the processing blocks, the time necessary before playback of the selected data item is started can be reduced.

For example, as shown in FIG. 13, the power supply voltage V2 in a moving image playback mode and the power supply voltage V3 in a still image playback mode are set to "ON", while supply of clocks to the processing blocks to which the power supply voltages V2 and V3 are supplied is set to "OFF". Thereafter, for example, when the operation mode is switched to a moving image playback mode or a still image playback mode, supply of clocks to the corresponding processing blocks is set to "ON".

At that time, since the power supply voltages V2 and V3 have already been provided to the processing blocks, data items can be read from the memory, and processing necessary for playback of the data items can be performed in advance. In this way, immediately after the clock is set to "ON", processing for the data item to be played back can be started. Thus, the time necessary before playback of the selected data item is started can be reduced.

As described above, according to the embodiment of the present invention, power supplied to individual processing blocks is separated, and the power is supplied to the individual processing blocks via different routes. In this way, power can be supplied to only processing blocks that are necessary in accordance with each of the operation modes. As a result, power consumption and leakage currents of unnecessary processing blocks in each of the operation modes can be reduced.

In addition, according to the embodiment of the present invention, in a monitoring mode that consumes much power of the image pickup apparatus, the image pickup apparatus is operated at a clock frequency lower than that of an existing image pickup apparatus. Therefore, the level of supplied voltages provided to the processing blocks necessary for a monitoring operation can be decreased. As a result, the power consumption can be reduced.

The present application contains subject matter related to that disclosed in Japanese Priority Patent Application JP 2008-072853 filed in the Japan Patent Office on Mar. 21, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image pickup apparatus comprising:
  an image pickup unit configured to photoelectrically convert light into an electrical signal serving as an imaging signal and output the imaging signal at predetermined frame intervals;
  a memory configured to store the imaging signal output from the image pickup unit;
  a first signal processing unit configured to generate, in a first device mode, a Y/C signal from the imaging signal output from the image pickup unit;
  a second signal processing unit configured to generate, in a second device mode, a Y/C signal from the imaging signal stored in the memory; and
  a control unit configured to selectively control power supplied to each of the first and second signal processing units in accordance with a respective device mode, such that, in the first device mode, the power supplied to the second signal processing unit is stopped, and in the second device mode, the power supplied to the first signal processing unit is stopped.

2. The image pickup apparatus according to claim 1, wherein the control unit further controls a clock supplied to each of the first and second signal processing units.

3. The image pickup apparatus according to claim 1, wherein the control unit further controls driving voltages of power supplied to the first and second signal processing units.

4. The image pickup apparatus according to claim 1, further comprising:
  a still image processing unit configured to process the imaging signal read out from the memory in the form of a still image;
  wherein the control unit further controls power supplied to the still image processing unit.

5. The image pickup apparatus according to claim 1, further comprising:
  a moving image processing unit configured to continuously process the imaging signal read out from the memory in the form of a moving image;
  wherein the control unit further controls power supplied to the moving image processing unit.

6. The image pickup apparatus according to claim 1, further comprising:
  a display control unit configured to perform control so that the imaging signal read out from the memory is displayed on an external display unit;
  wherein the control unit further controls power supplied to the display control unit.

7. A method for controlling an image pickup apparatus, comprising the steps of:
  (a) photoelectrically converting light into an electrical signal serving as an imaging signal and outputting the imaging signal at predetermined frame intervals;

(b) writing the imaging signal output in step (a) into a memory;

(c) generating, using a first signal processing unit in a first device mode, a Y/C signal from the imaging signal output in step (a);

(d) generating, using a second signal processing unit in a second device mode, a Y/C signal from the imaging signal stored in the memory; and (e) selectively controlling power supplied to each of the first and second signal processing units in accordance with a respective device mode, such that, in the first device mode, the power supplied to the second signal processing unit is stopped, and in the second device mode, the power supplied to the first signal processing unit is stopped.

8. A signal processing apparatus comprising:

a memory control unit configured to perform control so that a signal input thereto at predetermined frame intervals is written to an external memory;

a first signal processing unit configured to generate, in a first device mode, a Y/C signal from the input signal;

a second signal processing unit configured to generate, in a second device mode, a Y/C signal from the signal stored in the external memory; and a control unit configured to selectively control power supplied to each of the first and second signal processing units in accordance with a respective device mode, such that, in the first device mode, the power supplied to the second signal processing unit is stopped, and in the second device mode, the power supplied to the first signal processing unit is stopped.

9. The signal processing apparatus according to claim 8, wherein the control unit further controls a clock supplied to each of the first and second signal processing units.

10. The signal processing apparatus according to claim 8, wherein the control unit further controls driving voltages of power supplied to the first and second signal processing units.

11. The signal processing apparatus according to claim 8, further comprising:

a still image processing unit configured to process the signal read out from the external memory in the form of a still image;

wherein the control unit further controls power supplied to the still image processing unit.

12. The signal processing apparatus according to claim 8, further comprising:

a moving image processing unit configured to continuously process the signal read out from the memory in the form of a moving image;

wherein the control unit further controls power supplied to the moving image processing unit.

13. The signal processing apparatus according to claim 8, further comprising:

a display control unit configured to perform control so that the signal read out from the external memory is displayed on an external display unit;

wherein the control unit further controls power supplied to the display control unit.

14. A method for processing a signal, comprising the steps of:

performing control so that a signal input at predetermined frame intervals is written to an external memory;

generating, using a first signal processing unit in a second device mode, a Y/C signal from the input signal;

generating, using a second signal processing unit in a second device mode, a Y/C signal from the signal written to the external memory; and selectively controlling power supplied to each of the first and second signal processing units in accordance with a respective device mode, such that, in the first device mode, the power supplied to the second signal processing unit is stopped, and in the second device mode, the power supplied to the first signal processing unit is stopped.

* * * * *